(12) United States Patent
Englehart et al.

(10) Patent No.: US 9,891,894 B1
(45) Date of Patent: Feb. 13, 2018

(54) CODE CONTINUITY PRESERVATION DURING AUTOMATIC CODE GENERATION

(71) Applicant: The MathWorks, Inc., Natick, MA (US)

(72) Inventors: Matthew J. Englehart, Olmsted Township, OH (US); Xiaocang Lin, Sherborn, MA (US); Hidayet T. Simsek, Newton, MA (US); Peter S. Szpak, Newton, MA (US); Michael D. Tocci, Medway, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 13/966,979

(22) Filed: Aug. 14, 2013

(51) Int. Cl.
*G06F 9/44* (2006.01)

(52) U.S. Cl.
CPC .................................. *G06F 8/35* (2013.01)

(58) Field of Classification Search
CPC ........................................................ G06F 8/35
See application file for complete search history.

(56) References Cited

U.S. PATENT DOCUMENTS

| 8,448,130 | B1* | 5/2013 | Pillarisetti et al. | 717/104 |
| 2008/0127057 | A1* | 5/2008 | Costa et al. | 717/106 |
| 2009/0254881 | A1* | 10/2009 | Johnson | G06F 8/30 717/117 |
| 2011/0283269 | A1* | 11/2011 | Gass | G06F 8/65 717/168 |
| 2014/0280873 | A1* | 9/2014 | Stickle | H04L 63/1433 709/224 |

* cited by examiner

*Primary Examiner* — Li B Zhen
*Assistant Examiner* — Amir Soltanzadeh
(74) *Attorney, Agent, or Firm* — Harrity & Harrity, LLP

(57) ABSTRACT

A device may receive a model for code generation. The device may determine to preserve continuity with a first generated code associated with the model. The device may receive, based on determining to preserve continuity, a first generation record associated with the first generated code. The first generation record may include information associated with generation of the first code. The device may generate second code based on the model and the first generation record. The device may create a second generation record based on the second generated code. The second generation record may include information associated with generation of the second code. The device may provide the second generated code.

20 Claims, 22 Drawing Sheets

FIG. 10B

CODE CONTINUITY PRESERVATION DURING AUTOMATIC CODE GENERATION

BRIEF DESCRIPTION OF THE DRAWINGS

FIGS. 10A and 10B are diagrams of yet another example implementation relating to the example process shown in FIG. 6;

DETAILED DESCRIPTION

The following detailed description of example implementations refers to the accompanying drawings. The same reference numbers in different drawings may identify the same or similar elements.

Automatic programming may allow a user to generate code by developing algorithms using high-level abstraction. For example, a model-based development process may facilitate creation of a model using a functional block diagram and generating code therefrom to develop program code based on the model. During model-based development, the user may create and/or manipulate a model via a client device (e.g., in a technical computing environment), and the client device may generate code (e.g., C code, C++ code, Java code, etc.) corresponding to the model. There may be multiple functions for implementing the same model. Consequently, generating code corresponding to the model may include multiple decision steps, taken by the client device, such as an inferencing step, a lowering step, an optimization step, or the like. The user may perform extensive validation on the generated code to verify that the generated code accurately reflects the model.

The model may be periodically modified, such as by adding an element, removing an element, changing an element, or the like, and/or the client device may be periodically updated to include a new optimization technique, a new heuristic, or the like. However, a user may desire to preserve continuity between a previously generated version of program code and a newly generated version of program code to avoid re-performing extensive validation on the newly generated version of the program code. Implementations described herein may allow a client device to create a record of decisions made during code generation. Furthermore, the client device may utilize the record of decisions when re-generating code in order to preserve continuity with a previous version of the program code.

Figure 1:
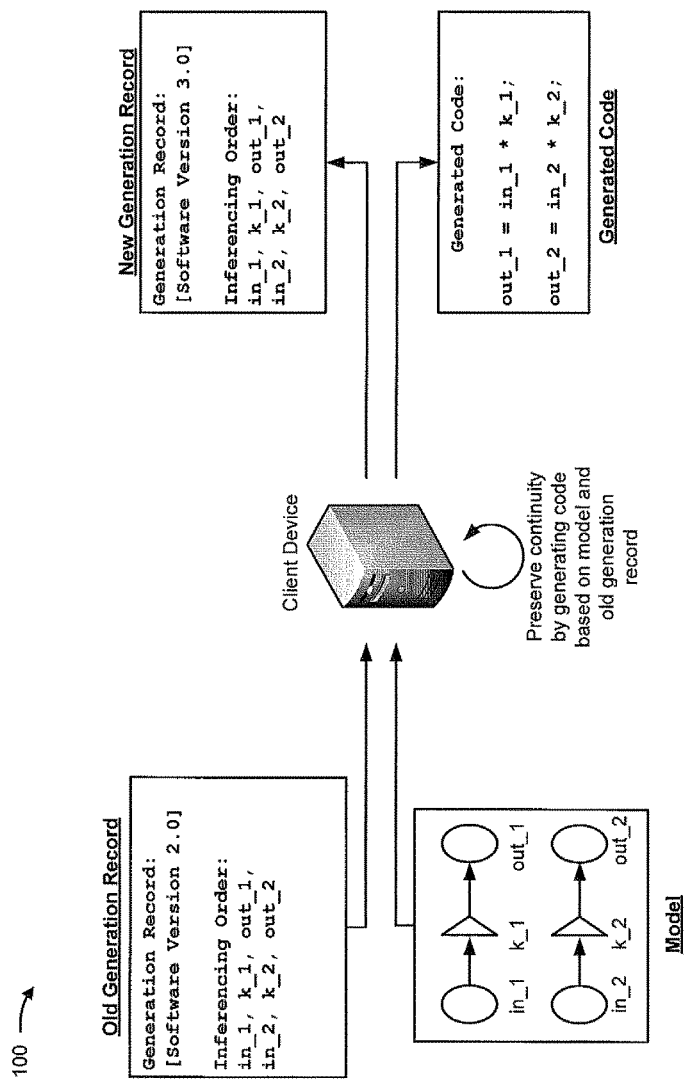
FIG. 1 is a diagram of an overview of an example implementation described herein.

FIG. 1 is a diagram of an overview of an example implementation 100 described herein. As shown in FIG. 1, a client device may receive, based on user input, a model from which program code is to be generated, and may receive a generation record associated with program code previously generated from the same, or a similar model. A model may refer to a graphical representation of a system, such as via a block diagram, a free-body diagram, a signal-flow graph, or the like. The generation record may include information associated with generation of the previously generated code, such as a previous version of the model, an identifier of the client device version and/or the technical computing environment version previously used to generate code, a previously generated code, an indicator of a result of a decision step used to generate the code, or the like. For example, the generation record may include an inferencing order previously used to generate code.

The client device may generate code with preserved continuity based on the model and the generation record. For example, the client device may preserve continuity by matching the inferencing order provided in the generation record. The client device may produce a new generation record associated with the newly generated code, and/or provide an explanation of the decisions made during code generation. The client device may provide the generated code and/or the generation record for display to the user. In this way, a client device may generate code while preserving continuity between versions of generated code.

Figure 2:
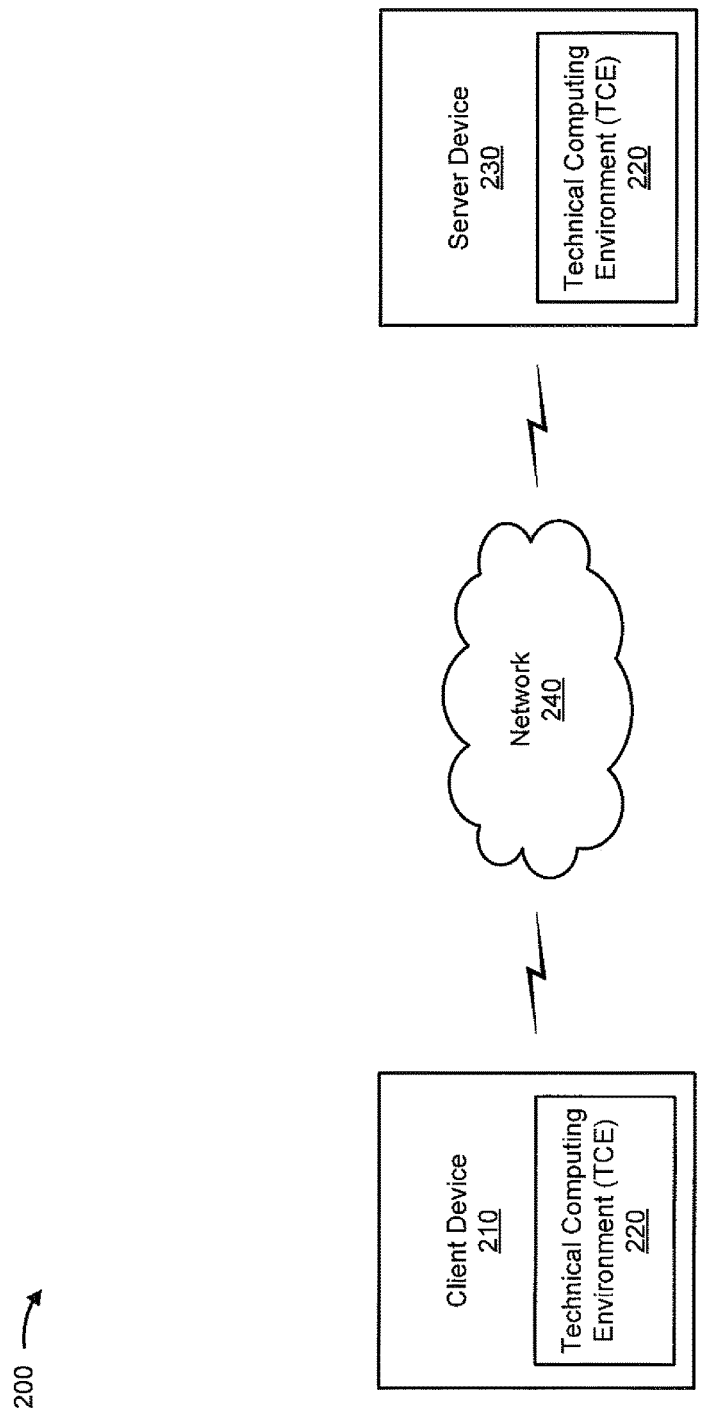
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include a device capable of receiving, generating, storing, processing, executing, and/or providing generated code and/or information associated with generated code (e.g., a model, a generation record, etc.). For example, client device 210 may include a computing device, such as a desktop computer, a laptop computer, a tablet computer, a handheld computer, a server, a mobile phone (e.g., a smart phone, a radiotelephone, etc.), or a similar device. In some implementations, client device 210 may receive information from and/or provide information to server device 230 (e.g., a model, a previous generation record, program code, etc.) via network 240.

Client device 210 may host TCE 220. TCE 220 may include any hardware-based logic or a combination of hardware and software-based logic that provides a computing environment that allows tasks to be performed (e.g., by users) related to disciplines, such as, but not limited to, mathematics, science, engineering, medicine, and business. TCE 220 may include a text-based environment (e.g., MATLAB® software), a graphically-based environment (e.g., Simulink® software, Stateflow® software, SimEvents® software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment.

TCE 220 may include, for example, a text environment (e.g., a text editor) and/or a graphical environment (e.g., a graphical user interface (GUI)) that permits a user to input a model. The model may include one or more function blocks. A function block, as used herein, is to be broadly interpreted to include a textual and/or graphical representation of a system process and may include an input port, an output port, a data type conversion, an integrator, a transfer function, a time delay, a logic block, or the like. TCE 220 may facilitate creation of the model by a user using one or more function blocks, and may generate code based on the model.

Server device 230 may include one or more devices capable of receiving, generating, storing, processing, executing, and/or providing generated code and/or information associated with generated code (e.g., a model, a generation record, etc.). For example, server device 230 may include a computing device, such as a server, a desktop computer, a laptop computer, a tablet computer, a handheld computer, or a similar device. In some implementations, server device 230 may host TCE 220.

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
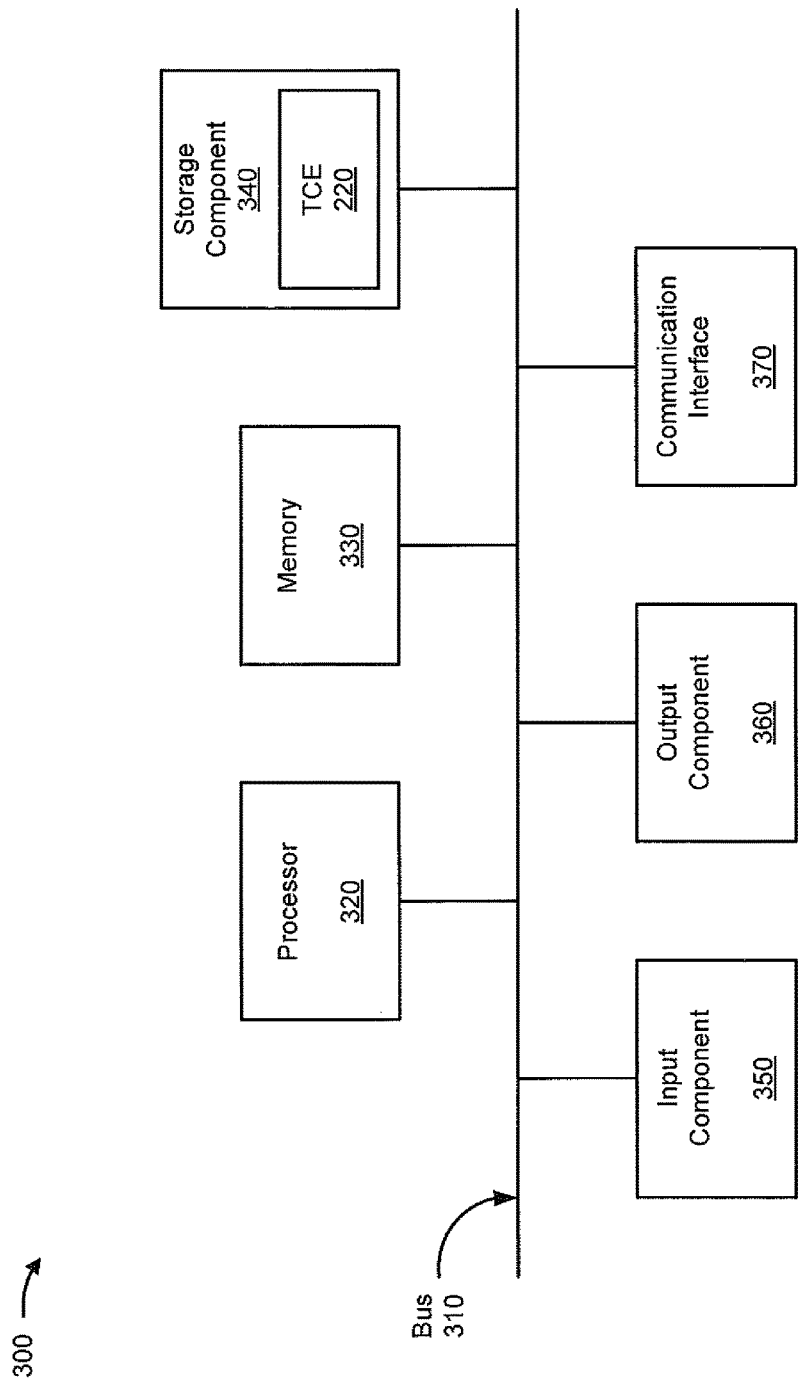
FIG. 3 is a diagram of example components of one or more devices of FIG. 2.

FIG. 3 is a diagram of example components of a device 300, which may correspond to client device 210 and/or server device 230. In some implementations, client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a path that permits communication among the components of device 300. Processor 320 may include a processor (e.g., a central processing unit, a graphics processing unit, an accelerated processing unit, etc.), a microprocessor, and/or any processing logic (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage component (e.g., a flash, magnetic, or optical memory) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, or the like.

Device 300 may perform one or more processes described herein. Device 300 may perform these processes in response to processor 320 executing software instructions included in a computer-readable medium, such as memory 330 and/or storage component 340. A computer-readable medium may be defined as a non-transitory memory device. A memory device may include memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

Figure 4:
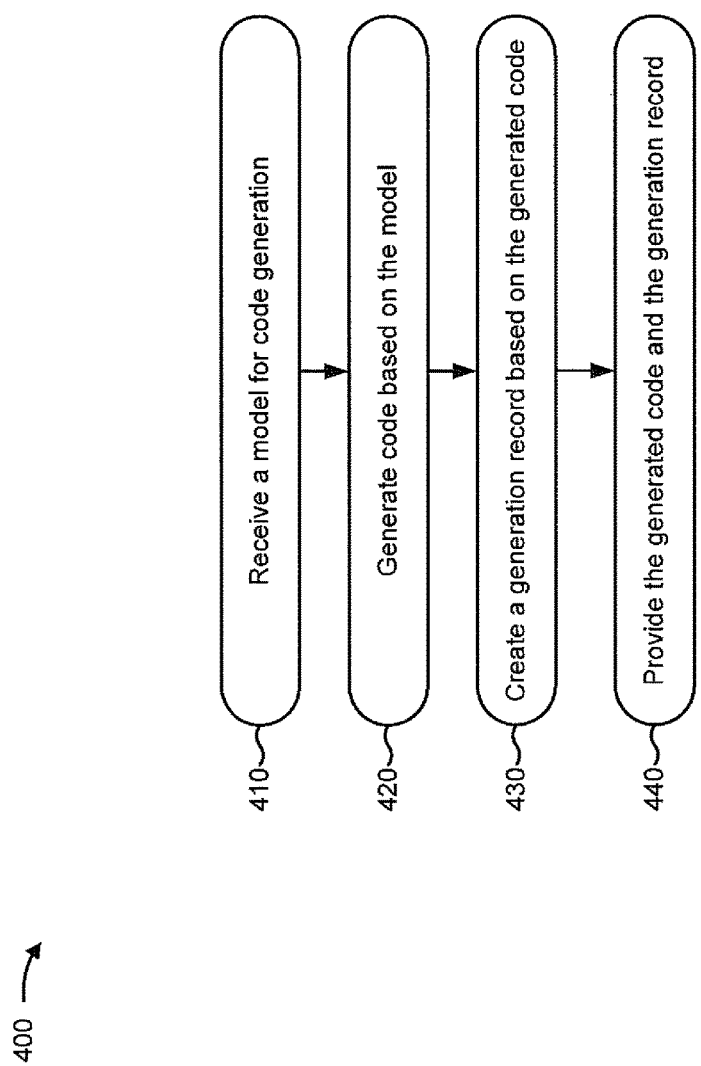
FIG. 4 is a flow chart of an example process for generating code and creating a generation record based on the generated code.

FIG. 4 is a flow chart of an example process 400 for generating code and creating a generation record based on the generated code. In some implementations, one or more process blocks of FIG. 4 may be performed by client device 210. In some implementations, one or more process blocks of FIG. 4 may be performed by another device or a group of devices separate from or including client device 210, such as server device 230.

As shown in FIG. 4, process 400 may include receiving a model for code generation (block 410). For example, client device 210 may receive the model from which code is to be generated. In some implementations, client device 210 (e.g., TCE 220) may receive input, from a user of client device 210, identifying the model for which code is to be generated. For example, the user input may include designing a new model, selecting a pre-existing model, or the like. A model may be interpreted broadly to refer to one or more function blocks representing mathematical operations (e.g., performed by a physical system being modeled).

As further shown in FIG. 4, process 400 may include generating code based on the model (block 420). For example, client device 210 may translate one or more function blocks, of the model, into program code. In some implementations, generating code based on the model may include one or more decision steps (e.g., steps for which client device 210 may make a choice as to how to implement the model), such as an inferencing step (e.g., a deduction of attributes associated with the model), a refactoring step (e.g., a reformatting of program code to improve readability), a lowering step (e.g., interpreting high level information into a lower level representation), an optimization step (e.g., applying one or more optimization techniques to the model and/or the generated code), a validation step (e.g., checking program code to ensure that the program code accurately and/or robustly reflects the model), a documentation step (e.g., annotating the program code to improve readability and code comprehension), or the like. For example, client device 210 may be capable of generating code either by using a peephole optimization or without using the peephole optimization. In this case, client device 210 may determine whether to use the peephole optimization based on an instruction, such as a pre-set instruction, a user instruction, or the like.

Client device 210 may reserve resource blocks to support subsequent model modifications and code re-generations to be included within the generated code, in some implementations. For example, a user may indicate that client device 210 is to reserve a block of memory for a future addition to the model, and client device 210 may generate code including the reservation.

As further shown in FIG. 4, process 400 may include creating a generation record based on the generated code (block 430). For example, client device 210 may create a record of a resolution of one or more decision steps. In some implementations, the generation record may include information identifying a version of a device (e.g., client device 210) used for code generation. In some implementations, the generation record may include information identifying a version of software (e.g., TCE 220) used for code generation. Software version, version, version of software, etc., are to be interpreted broadly to refer to a different device, a differently configured device, a device using a different software, a device using a differently configured software, etc. In some implementations, different versions of TCE 220 may include one or more different code generation options, such as a different optimization algorithm, a different heuristic, or the like. In some implementations, information identifying the one or more different code generation options, associated with the version of TCE 220 identified in the code generation record, may be provided by server 230 (e.g., via network 240).

In some implementations, the generation record may include information identifying assumptions made while generating code. For example, client device 210 may include a record of a resolution of a decision step, such as a block order (e.g., an order in which function blocks are executed to process a variable), a name-mangling order (e.g., an order in which resolution of unique variable names is applied), or the like. Additionally, or alternatively, the generation record may identify the use of a code generation operation, such as a parameter pooling operation (e.g., a parameter data reuse), timer reuse operation (e.g., a reuse of data to support multiple timers), a file and function packaging operation (e.g., a compiling decision), or the like. Additionally, or alternatively, the generation record may include a record of an optimization technique used by client device 210. For example, client device 210 may indicate that client device 210 performed an optimization function, such as a range analysis optimization (e.g., an optimization of fixed-point data types based on derived data), a buffer reuse optimization (e.g., a reuse of signal storage), a constant folding optimization (e.g., a simplification of constant expressions at model compile time), a peephole optimization (e.g., a replacement of one or more instructions by one or more shorter or more efficient instructions), a backfolding optimization (e.g., a reduction in a quantity of assignment operations and/or variables), a conditional input optimization (e.g., a determination of an execution property of a function block by selectively disabling the function block), or the like. In some implementations, the generation record may include information identifying user decisions that altered code generation. For example, when the user reserves resources for a future addition to the model, the generation record may include information identifying the reserved resources.

The generation record may include information associated with the model used for code generation, in some implementations. For example, client device 210 may include information identifying the model, such as a file identifier (e.g., a model file name, a mode file location, etc.), a version of the model (e.g., the same model, a copy of the model, a modified version of the model, etc.), information identifying one or more elements of the model (e.g., one or more function blocks), or the like. In some implementations, the generation record may include information associated with the generated code. For example, client device 210 may include information identifying the generated code, such as a file identifier (e.g., a program code file name, a program code file location, etc.), a version of the program code (e.g., the generated code, a copy of the generated code, a modified and/or annotated version of the generated code, etc.).

As further shown in FIG. 4, process 400 may include providing the generated code and the generation record (block 440). For example, client device 210 (e.g., via TCE 220) may provide the generated code and/or the generation record for display. Additionally, or alternatively, the generated code and/or the generation record may be provided for storage, processing, etc. In some implementations, the generated code and the generation record may be provided separately. For example, client device 210 may provide the generated code for display, and may store the generation record. In some implementations, the generated code and the generation record may be provided together. For example, the generation record may be included as non-executable code (e.g., a comment, a documentation, etc.) within the generated code.

In this way, client device 210 may create a generation record, associated with generated code, and provide it for use in preserving continuity when program code is re-generated.

Although FIG. 4 shows example blocks of process 400, in some implementations, process 400 may include additional blocks, different blocks, fewer blocks, or differently arranged blocks than those depicted in FIG. 4. Additionally, or alternatively, two or more of the blocks of process 400 may be performed in parallel.

Figure 5A:
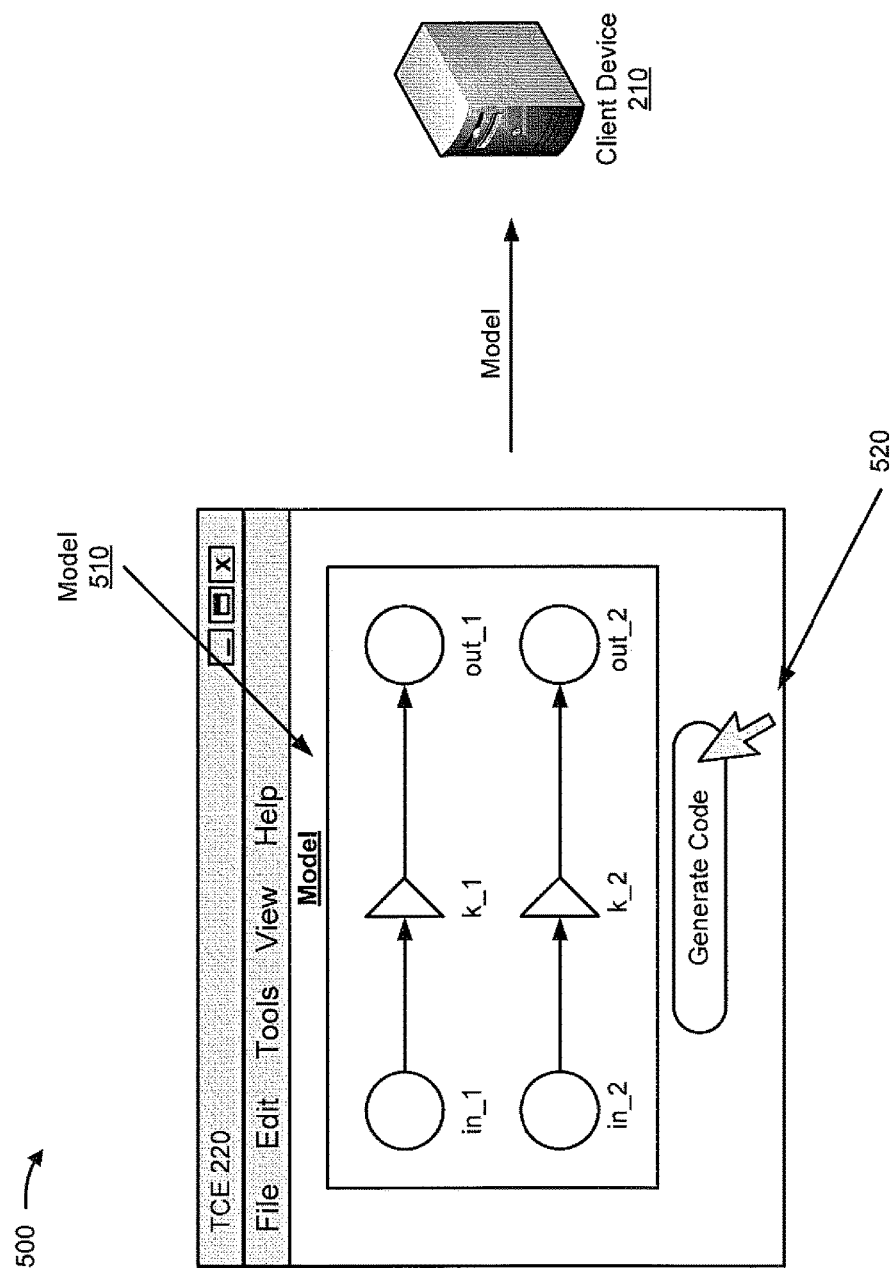
FIGS. 5A and 5B are diagrams of an example implementation relating to the example process shown in FIG. 4.
Figure 5B:
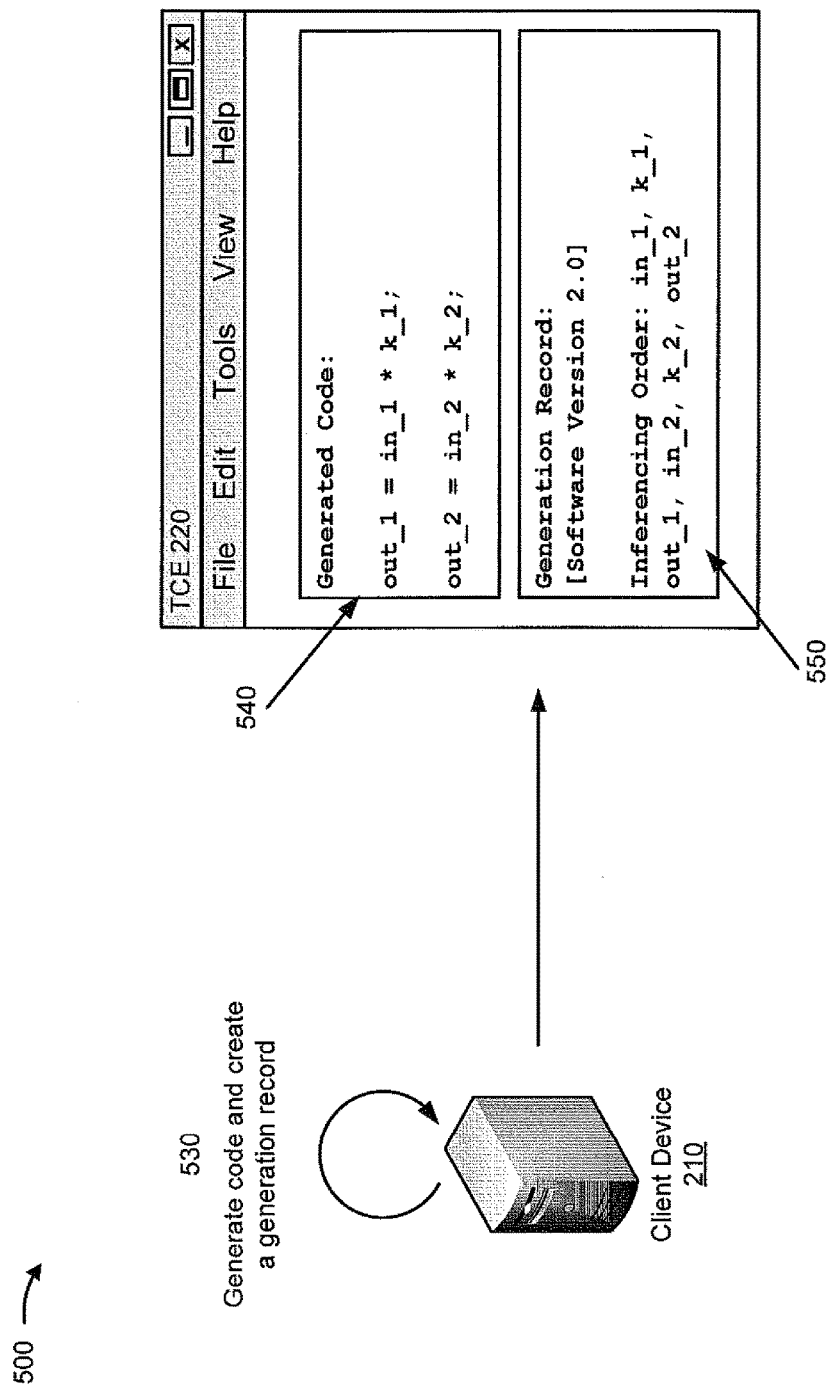

FIGS. 5A and 5B are diagrams of an example implementation 500 relating to process 400 shown in FIG. 4. As shown in FIG. 5A, example implementation 500 includes TCE 220 and model 510. Assume that a user has designed model 510 using TCE 220. Model 510 includes inputs (e.g., "in_1" and "in_2"), functions (e.g., "k_1" and "k_2"), and outputs (e.g., "out_1" and "out_2"). As shown by reference number 520, based on user interaction with the "Generate Code" button, client device 210 may generate code based on model 510.

As shown in FIG. 5B, and by reference number 530, assume that client device 210 generates code and creates a generation record based on model 510. The generated code and the generation record are provided to TCE 220 for display. As shown by reference number 540, code has been generated to represent the model (e.g., via a system of equations). As shown by reference number 550, the generation record, created by client device 210, includes a software version used for code generation (e.g., "Software Version 2.0") and the inferencing order used for code generation (e.g., in_1, k_1, out_1, etc.). The inferencing order may refer to an order, determined by client device 210, in which function blocks (e.g., the function blocks represented by in_1, in_2, etc.) are to be processed for inferencing (e.g., for conversion into a mathematical system expressed via program code).

As indicated above, FIGS. 5A and 5B are provided merely as an example. Other examples are possible and may differ from what was described with regard to FIGS. 5A and 5B.

Figure 6:
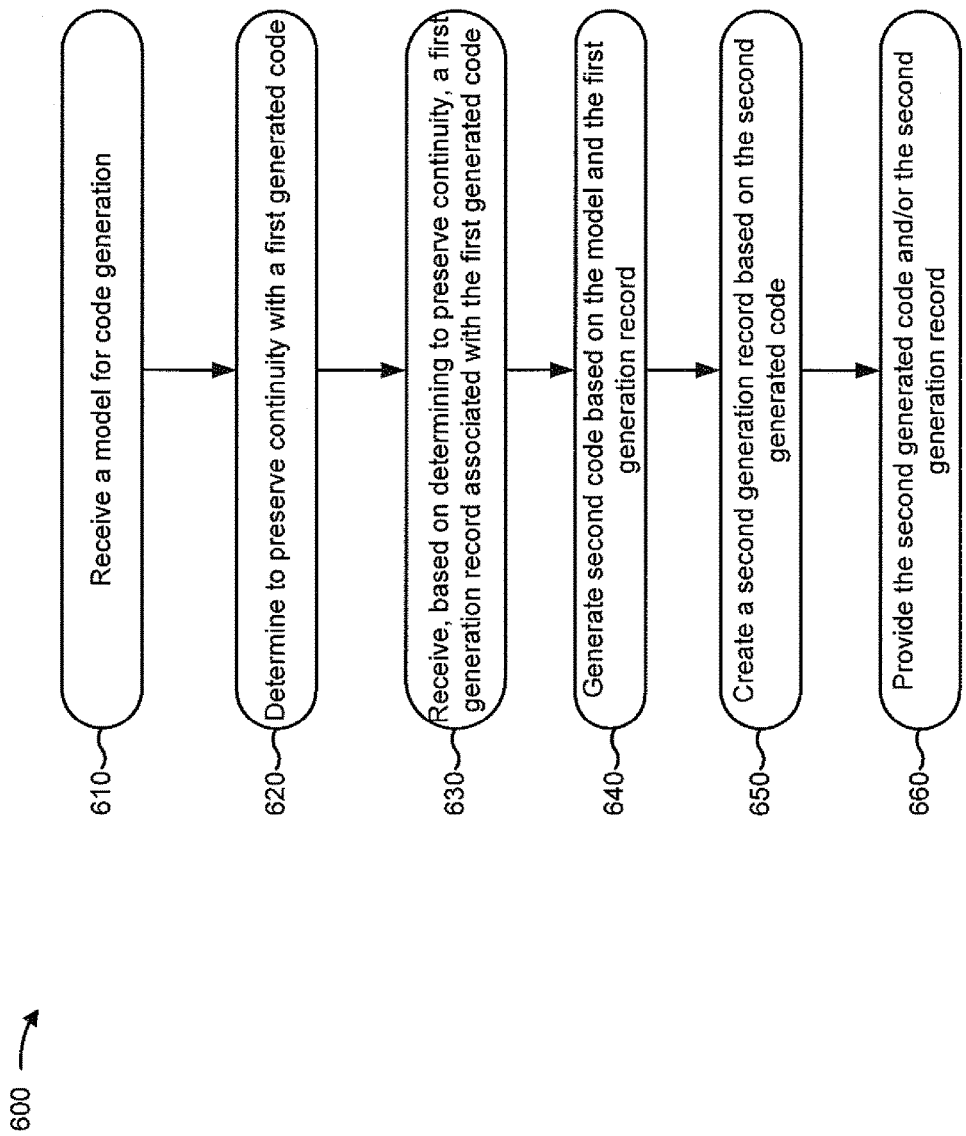
FIG. 6 is a flow chart of an example process for preserving code continuity during code generation.

FIG. 6 is a flow chart of an example process 600 for preserving code continuity during code generation. In some implementations, one or more process blocks of FIG. 6 may be performed by client device 210. In some implementations, one or more process blocks of FIG. 6 may be performed by another device or a group of devices separate from or including client device 210, such as server device 230.

As shown in FIG. 6, process 600 may include receiving a model for code generation (block 610). For example, client device 210 may receive (e.g., via TCE 220) the model from which code generation is to be performed, as discussed herein in connection with FIG. 4.

As further shown in FIG. 6, process 600 may include determining to preserve continuity with a first generated code (block 620). For example, client device 210 may determine (e.g., via TCE 220) that continuity with the first generated code is to be preserved during code generation. In some implementations, the first generated code may include code previously generated based on the model, based on another model sharing a similar characteristic with the model (e.g., a similar function block, a similar system structure, etc.). Continuity may refer to a similarity between the first generated code and a second generated code. In some implementations, continuity may be determined based on a software metric, such as a RAM usage, a ROM usage, a quantity of lines of different program code, a cyclomatic complexity (e.g., a quantity of linearly independent paths through the program code), or the like.

Client device 210 may determine to preserve continuity based on user input, in some implementations. For example, client device 210 may receive input indicating that continuity is to be preserved with previously generated code.

Client device 210 may determine to preserve continuity of the entire program code, in some implementations. For example, the user may provide input indicating that client device 210 is to preserve continuity based on one or more preset conditions, such as minimizing a quantity of different program code lines between previously generated code and newly generated code, maintaining variable labeling between previously generated code and newly generated code, or the like. In this case, client device 210 may preserve continuity throughout code generation without prompting the user for further input.

In some implementations, client device 210 may determine to preserve continuity for a particular portion of program code. For example, the user may provide input indicating a portion of program code for which continuity is to be preserved, such as a segment of previously generated code, a section of the model, or the like. In this case, client device 210 may generate code, and may preserve continuity with respect to the particular indicated section without prompting the user for further input.

Additionally, or alternatively, client device 210 may receive input, associated with determining whether to preserve continuity, during code generation. For example, client device 210 may determine that a decision step may result in a discontinuity. In this case, client device 210 may provide information identifying the segment of code for which the discontinuity may occur (e.g., as a result of a new optimization), and a user may provide input indicating whether to preserve continuity with respect to the particular segment of code. In some implementations, client device 210 may determine to receive input, associated with determining whether to preserve continuity, based on the type of decision step. For example, client device 210 may query the user to determine whether to preserve continuity when the decision step is an optimization step.

Client device 210 may compare continuity options, in some implementations. For example, the user may indicate that client device 210 is to generate code both with continuity preserved and without continuity preserved and provide both versions of the generated code. In this case, the user may select between the program code generated with continuity preserved and the program code generated without preserving continuity.

Client device 210 may preserve continuity based on a threshold setting, in some implementations. For example, the user may indicate a threshold level of a software metric for client device 210 to use in determining the extent to which continuity is to be preserved during code generation. In this case, client device 210 may preserve continuity to the extent indicated to satisfy the threshold. For example, the user may indicate that continuity preservation is to be suppressed if an optimization reduces cyclomatic complexity by a threshold percentage, and client device 210 may calculate, for a potential optimization, the reduction in cyclomatic complexity before determining to suppress continuity preservation.

Client device 210 may preserve continuity as a code generation objective, in some implementations. A code generation objective may refer to a prioritized factor in generating code. For example, client device 210 may generate code based on multiple factors, such as RAM performance, ROM performance, CPU performance, traceability, continuity, or the like. In this case, a user may provide input to client device 210 indicating a particular priority (e.g., as compared to a particular priority for another code generation objective) with which client device 210 is to treat continuity preservation during code generation. Additionally, or alternatively, client device 210 may provide information, to the user, associated with configuring one or more parameters, which are associated with code generation, based on determining that continuity preservation is to be a code generation objective.

Client device 210 may provide relational information regarding the code generation objectives while generating code, in some implementations. For example, where a user selects RAM efficiency as a first code generation objective, preservation of statement order from first generated code as a second generation objective, and preservation of an order of elements from first generated code as a third generation objective, client device 210 may provide information to the user indicating that preservation of statement order is more compatible with RAM efficiency than preservation of the order of elements. In this case, client device 210 may, based on user feedback, generate second code based on the first generation objective (e.g., RAM efficiency) and the compatible, second generation objective (e.g., preservation of statement order), but not based on the incompatible, third generation objective (e.g., preservation of the order of elements).

As further shown in FIG. 6, process 600 may include receiving, based on determining to preserve continuity, a first generation record associated with the first generated code (block 630). For example, client device 210 may receive the first generation record associated with the first generated code. In some implementations, the first generation record may include the generation record created while generating the first generated code, as discussed herein in connection with FIG. 4. For example, client device 210 may receive information (e.g., via user input, server device 230, etc.) identifying decisions made while generating the first generated code (e.g., via a stored generation record, a previous model used for code generation, the first generated code, etc.). Additionally, or alternatively, client device 210 may receive user input indicating decisions made while generating the first generated code. For example, the user may provide information identifying a version of software used to generate the first generated code, a change between the model and another model used to generate the first generated code, optimizations enabled while generating the first generated code, etc.

As further shown in FIG. 6, process 600 may include generating second code based on the model and the first generation record (block 640). For example, client device 210 may generate the second code based on the model and the first generation record. In some implementations, client device 210 may generate the second code based on the model in a similar manner as generating the first generated code, as discussed herein in connection with FIG. 4. In some implementations, client device 210 may interact (e.g., via TCE 220) with the user during code generation. For example, when, at a decision step, client device 210 detects that a segment of the second generated code will differ from a segment of the first generated code, client device 210 may query the user for input as to whether continuity is preferable to optimization at the particular segment of code.

Client device 210 may process the first generation record to determine the first generated code, in some implementations. For example, client device 210 may extract the first generated code from the first generation record. Additionally, or alternatively, client device 210 may recreate the first generated code based on information in the first generation record. In some implementations, client device 210 may determine that the first generated code was produced by a different code generation software version, and may query the user as to whether to selectively suppress continuity preservation with respect to obsolete code patterns in the first generated code. For example, client device 210 may identify a segment of code for which a newly available heuristic results in superior performance sufficient to justify suppressing continuity (e.g., increasing post code generation validation). In this case, client device 210 may provide information to the user identifying the segment of code, and the user may choose to suppress continuity preservation with respect to the segment of code. In some implementations, client device 210 may determine to suppress a newly available optimization, based on processing the first generated code. For example, client device 210 may preserve continuity by maintaining a previous parameter pooling, suppressing optimizations to function blocks (e.g., a timer reuse, a file and function packaging change), preserving vector rolling (e.g., where the vector is determined to have changed between the previous model and the new model), generating an extraneous segment of code (e.g., an empty interface function, an extra variable, etc.), or the like.

Client device 210 may utilize segments of well-contained code, determined based on the generation record, to ensure continuity preservation, in some implementations. A segment of well-contained code may refer to one or more lines of code, identified by a user and/or recognized by client device 210, that correspond to a particular function. For example, the generation record may include information identifying one or more equations associated with a segment. In this case, client device 210 may utilize the generation record to generate the same equations for the same identified segment. For example, client device 210 may utilize the generation record to reserve a choice of identifiers (e.g., variable identifiers, function identifiers, etc.) for the segment, and may apply the identifiers to the segment during code generation so as to ensure code continuity.

Client device 210 may process the first generation record to determine a configuration parameter associated with generating the first generated code, in some implementations. For example, client device 210 may determine that an optimization method has been altered from a prior version of code generation software. In this case, client device 210 may query the user as to whether to selectively suppress continuity preservation and use the altered optimization method. Alternatively, client device 210 may emulate the prior version of the code generation software by matching the configuration of the prior version and suppressing updated optimizations and/or heuristics.

Client device 210 may process the first generation record to determine a previous model used for generating the first generated code, in some implementations. For example, client device 210 may determine a result of previous optimizations performed on the previous model, and may use the result for generating the second generated code, such as by seeding a name-mangling order, seeding a block order, or the like. In some implementations, when a difference is determined between a setting of the previous model and a setting of the current model, client device 210 may determine to modify the setting of the current model to preserve continuity. For example, client device 210 may provide the user with information identifying the setting of the model that may be altered to preserve continuity.

Client device 210 may emulate a previous version of TCE 220 to preserve continuity while generating code, in some implementations. For example, client device 210 may identify a previously used code-generation technique associated with the previous version of TCE 220, based on the first generation record. A code-generation technique may refer to a process (e.g., an optimization used, a method of inferencing, a software version that includes a method of inferencing, etc.) by which code is generated. Client device 210 may determine that the current code-generation technique associated with TCE 220 is different from the previously used code-generation technique. In this case, client device 210 may use the previously used code-generation technique for new code generation in order to preserve continuity.

Client device 210 may verify code continuity during code generation, in some implementations. For example, client device 210 may compare an inferencing record from the first generation record to an inferencing record being used for code generation to determine logical equivalence (e.g., equivalence of the inferencing record, equivalence of a sub-tree of the inferencing record, etc.). In this case, client device 210 may utilize name mangling and/or optimization steps (e.g., determined from the first generation record) to test code continuity, and may adjust the code generation and/or provide feedback based on testing the code continuity. In some implementations, client device 210 may identify segments of equivalence (e.g., segments of code that are determined to have continuity with previously generated code) and may provide information identifying the segments of equivalence.

Client device 210 may determine invalid first generated code, based on the code generation record, and may identify the invalid first generated code prior to generating second code, in some implementations. For example, when client device 210 is generating second code based on the first generation record so as to preserve behaviors and/or semantics associated with the first generated code, client device 210 may determine that the first generated code is invalid (e.g., the semantics of the first generated code are faulty, a previous version of client device 210 that generated the first code was faulty, a behavior of the first generated code is ambiguous, etc.). In this case, client device 210 may receive an indication from a user, based on identifying the detected invalidity to the user, as to whether client device 210 is to generate second code that removes the invalidity.

As further shown in FIG. 6, process 600 may include creating a second generation record based on the second generated code (block 650). For example, client device 210 may create a second generation record based on the second generated code in a similar manner as creating the first generation record, as discussed herein in connection with FIG. 4. In some implementations, the second generation record may include information identifying a result of a decision of client device 210, such as an inferencing decision, an optimization decision, or the like. Additionally, or alternatively, the second generation record may include information identifying a decision of the user. For example, the second generation record may include a decision to suppress an optimization technique, a decision to maintain an empty function, or the like.

The second generation record may include information associated with the first generation record, in some implementations. For example, client device 210 may include information in the second generation record, such as the first generation record, the version of software used to create the first generation record, the first generated code (e.g., the code from which continuity is preserved), or the like. In some implementations, the second generation record may include an indication of decisions in which continuity was not preserved, such as a previous file and function packaging, a previous parameter pooling, or the like. In some implementations, client device 210 may parse the second generated code to determine continuity changes with the first generated code. For example, client device 210 may determine one or more lines of program code where continuity was not preserved, and may include information in the second generation record identifying why continuity was not preserved (e.g., based on user input, based on a model change, based on a new optimization, etc.). In some implementations, client device 210 may determine a validation check, associated with the one or more lines of program code where continuity was not preserved, and may indicate that the validation check should be re-performed on the second generated code.

As further shown in FIG. 6, process 600 may include providing the second generated code and/or the second generation record (block 660). For example, client device 210 may provide (e.g., via TCE 220) the second generated code and/or the second generation record in a similar manner as providing the first generated code and/or the first generation record, as discussed herein in connection with FIG. 4.

In this way, client device 210 may generate code that preserves continuity with a previously generated code, and may provide a record of decisions made during code generation.

Although FIG. 6 shows example blocks of process 600, in some implementations, process 600 may include additional blocks, different blocks, fewer blocks, or differently arranged blocks than those depicted in FIG. 6. Additionally, or alternatively, two or more of the blocks of process 600 may be performed in parallel.

Figure 7A:
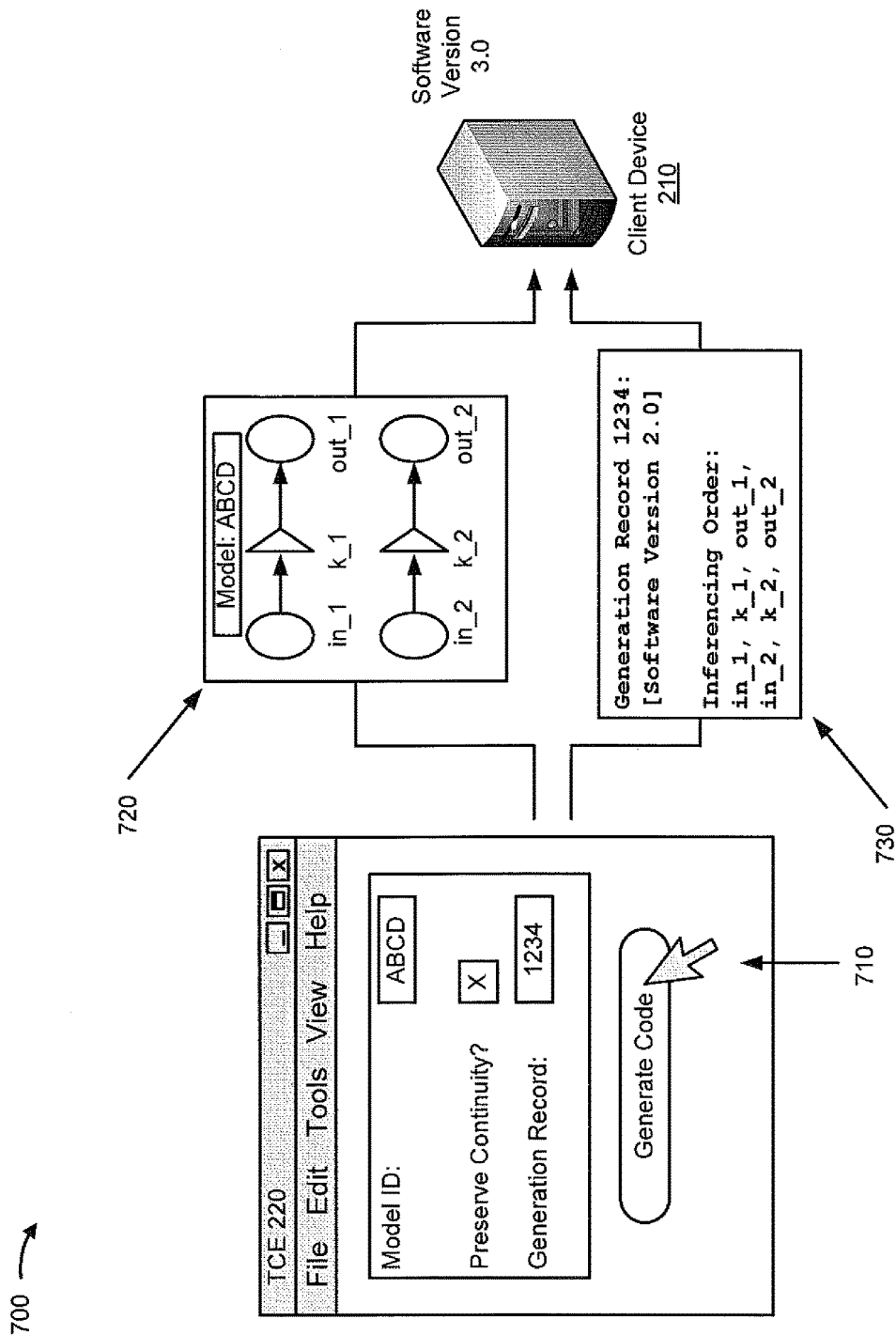
FIGS. 7A and 7B are diagrams of an example implementation relating to the example process shown in FIG. 6.
Figure 7B:
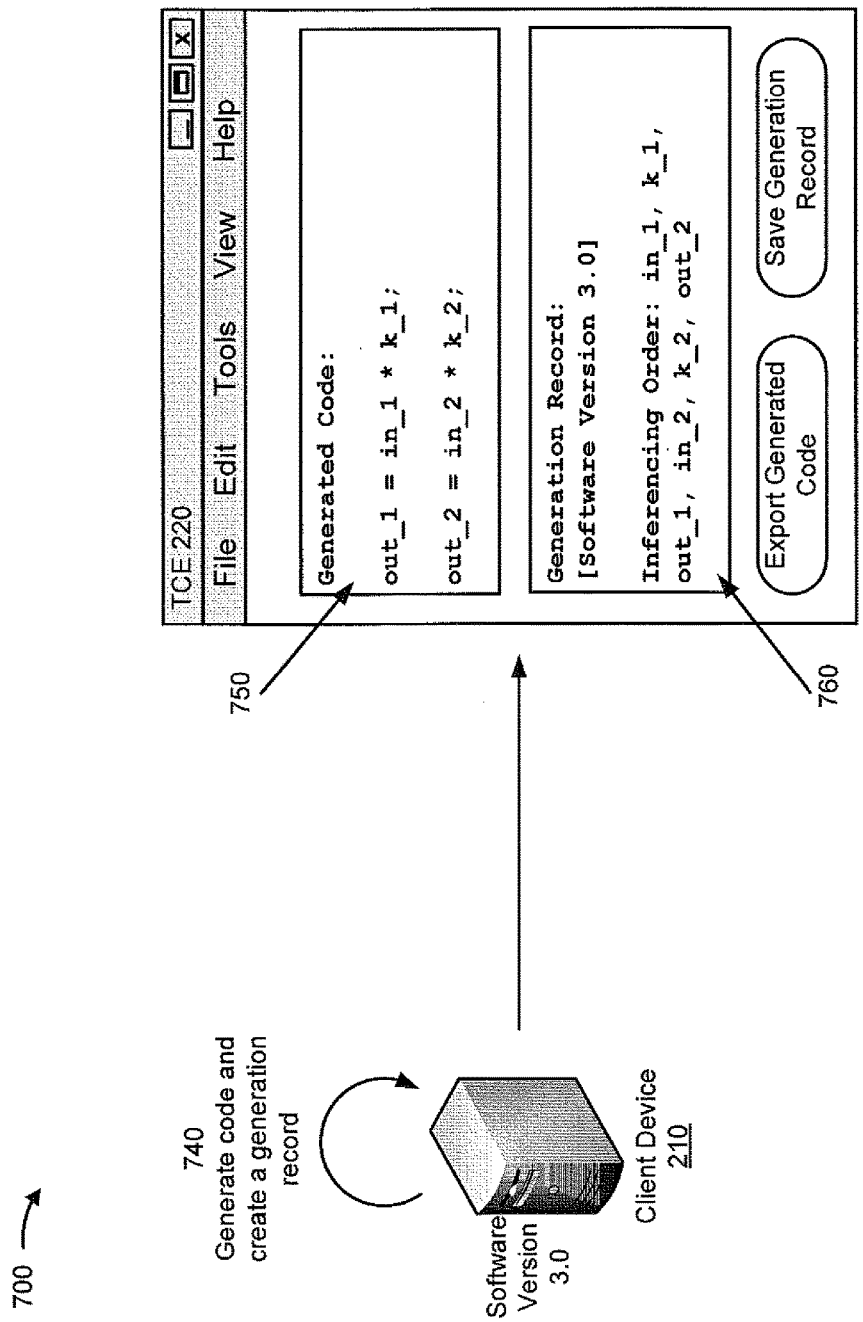

FIGS. 7A and 7B are diagrams of an example implementation 700 relating to process 600 shown in FIG. 6. As shown in FIG. 7A, example implementation 700 includes TCE 220. Assume that a user has identified a model (e.g., "Model ID: ABCD"), has determined to preserve continuity (e.g., via interaction with a checkbox), and has identified a first generation record (e.g., "Generation Record: 1234"). As shown by reference number 710, based on user interaction with the "Generate Code" button, client device 210 may generate code based on model ABCD. As shown by reference number 720, model ABCD is accessed and provided to client device 210. As shown by reference number 730, generation record 1234 is accessed and provided to client device 210. Assume that generation record 1234 identifies an inferencing order and identifies a software version responsible for generating a previous generated code, based on the inferencing order, with which continuity is to be preserved (e.g., "Software Version 2.0"). Further assume that client device 210 uses a different software version to generate new code (e.g., "Software Version 3.0").

As shown in FIG. 7B, and by reference number 740, client device 210 generates new generated code based on model ABCD and generation record 1234, and client device 210 creates a generation record based on the new generated code. As shown by reference number 750, the new generated code is provided to the user via TCE 220. As shown by reference number 760, the generation record identifies the software version used to generate the new generated code (e.g., "Software Version 3.0") and the inferencing order used to generate the new generated code.

As indicated above, FIGS. 7A and 7B are provided merely as an example. Other examples are possible and may differ from what was described with regard to FIGS. 7A and 7B.

Figure 8A:
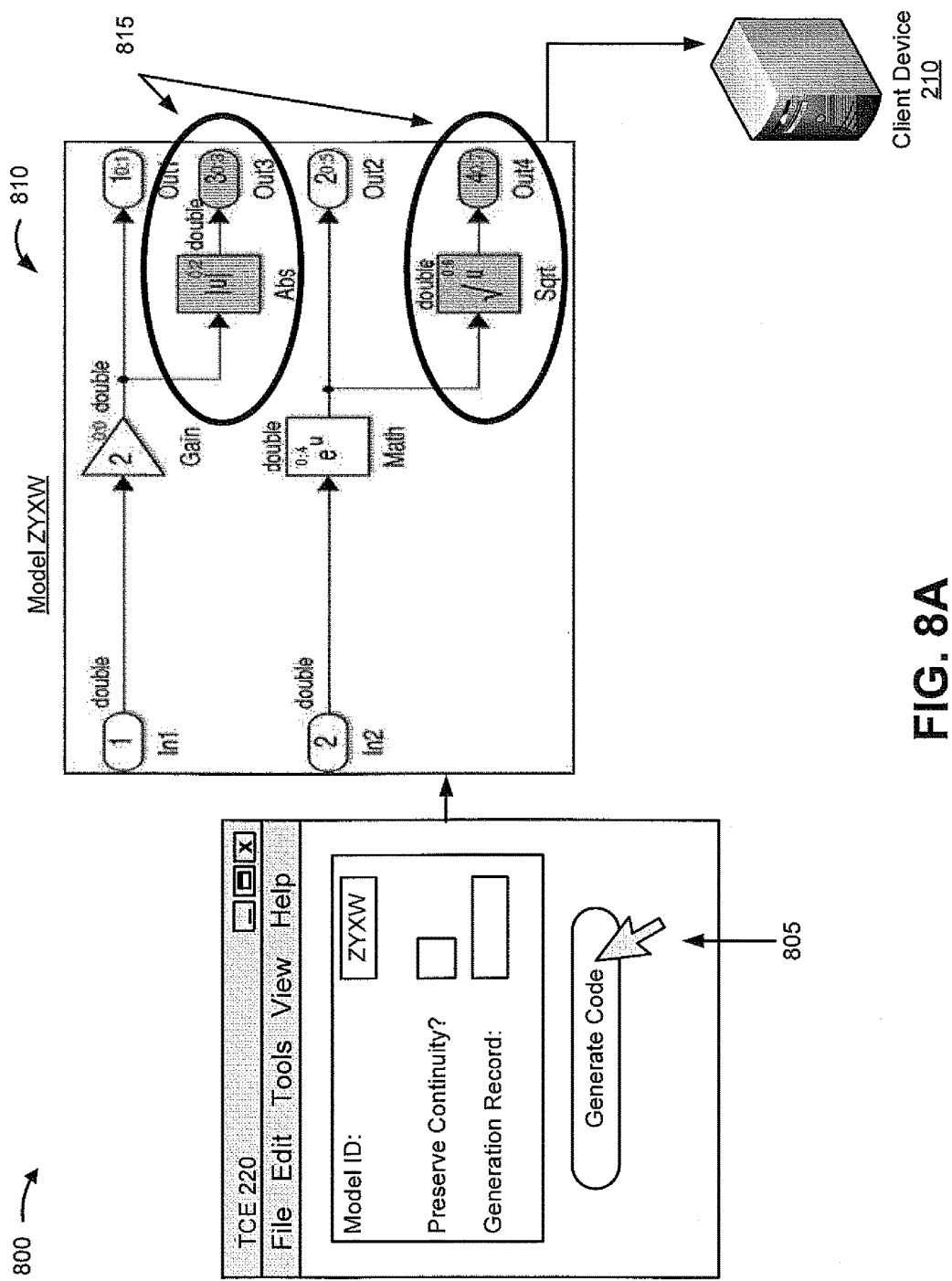
FIGS. 8A-8D are diagrams of another example implementation relating to the example process shown in FIG. 6.

FIGS. 8A-8D are diagrams of an example implementation 800 relating to process 600 shown in FIG. 6. As shown in FIG. 8A, example implementation 800 includes TCE 220. Assume that a user has identified a model (e.g., "Model ID: ZYXW") and has determined not to preserve continuity (e.g., via interaction with a checkbox). As shown by reference number 805, based on user interaction with the "Generate Code" button, client device 210 generates code based on model ZYXW. As shown by reference number 810, model ZYXW is accessed and provided to client device 210.

As shown by reference number 815, function blocks (e.g., "Abs(|u|)," "Out3," "Sqrt(u)," and "Out4") have been added to model ZYXW subsequent to a previous code generation.

Figure 8B:
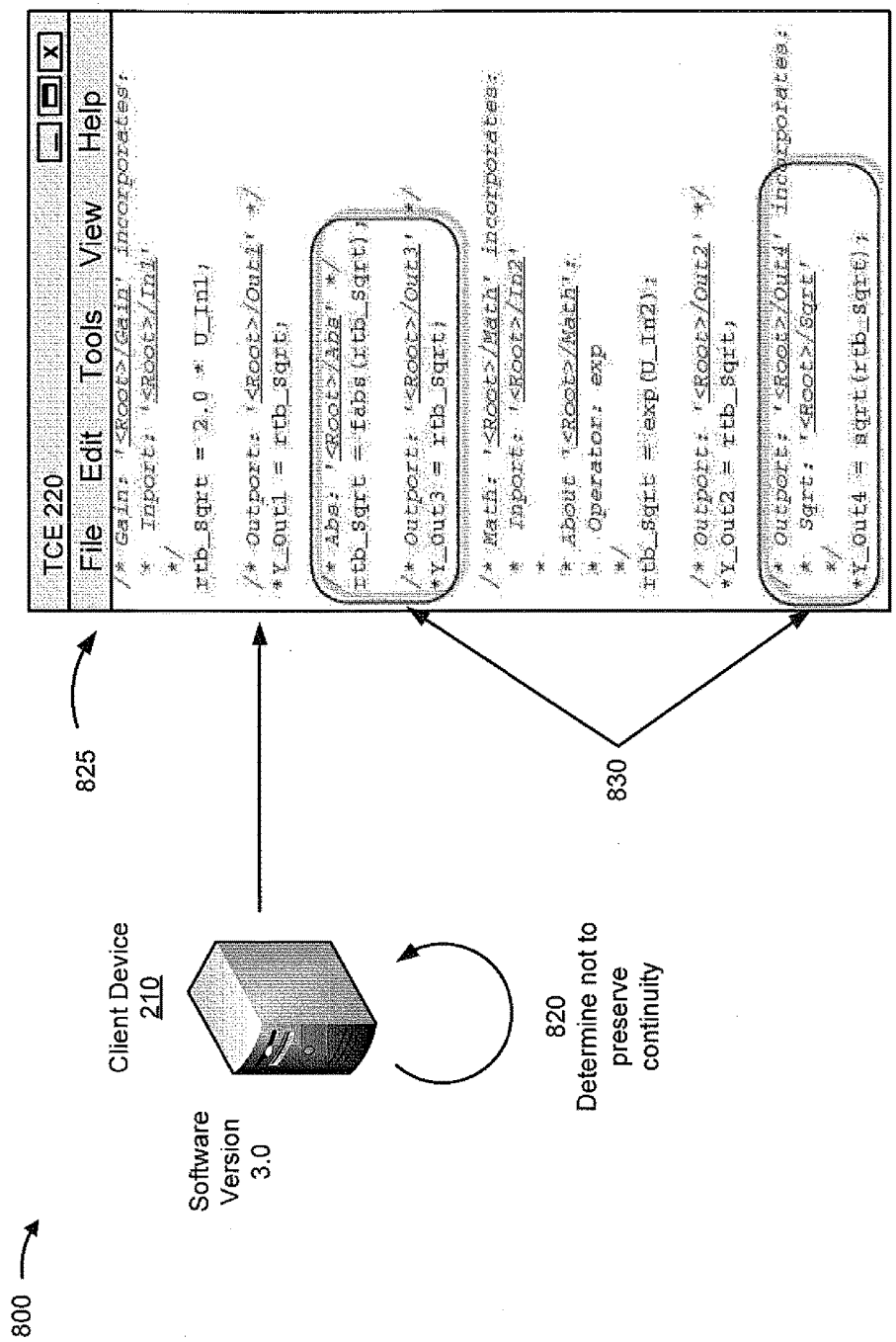

As shown in FIG. 8B, and by reference number 820, client device 210 generates code based on model ZYXW without preserving continuity. In this case, as shown by reference number 825, the generated code is provided to the user via TCE 220. As shown by reference number 830, generating code without preserving continuity results in new code, based on the new function blocks, being interleaved within the old code. Visual continuity of the code is suppressed in favor of a single local variable (e.g., "rtb_Sqrt") being newly declared in the generated code. In this way, the newly generated code is optimized for memory usage using the new software version, but continuity has not been preserved, resulting in more code validation for the user.

Figure 8C:
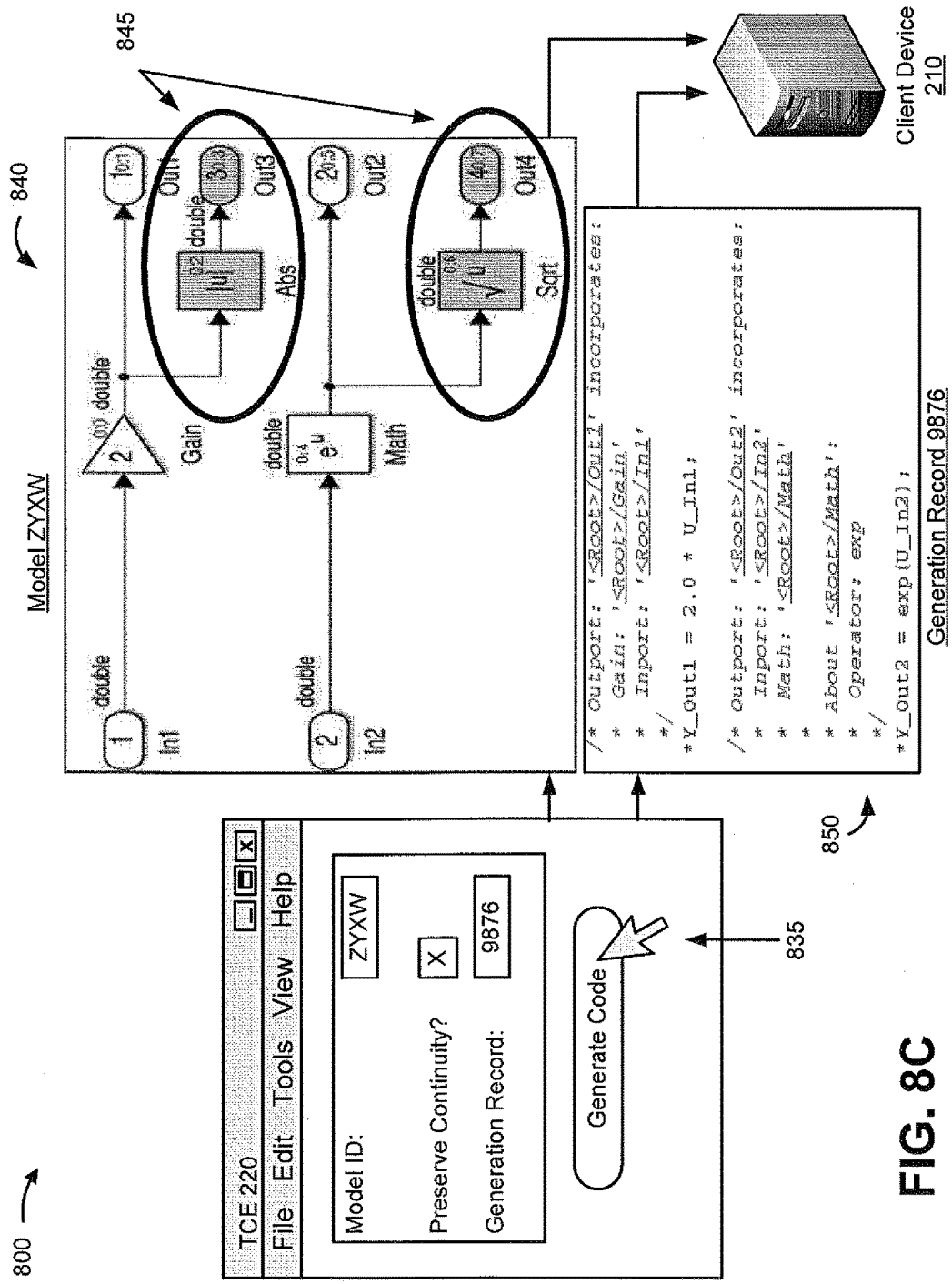

As shown in FIG. 8C, in another example, assume that the user has identified the same model (e.g., "Model ID: ZYXW"), has determined to preserve continuity (e.g., via interaction with a checkbox), and has identified a first generation record (e.g., "Generation Record: 9876"). As shown by reference number 835, based on user interaction with the "Generate Code" button, client device 210 generates code based on model ZYXW. As shown by reference number 840, model ZYXW is accessed and provided to client device 210. As shown by reference number 845, the same function blocks (e.g., "Abs(|u|)," "Out3," "Sqrt(u)," and "Out4") have been added to model ZYXW. As shown by reference number 850, generation record 9876 is accessed and provided to client device 210. Generation record 9876 includes previously generated code, generated prior to the addition of the function blocks to model ZYXW, and supporting documentation based on the previously generated code.

Figure 8D:
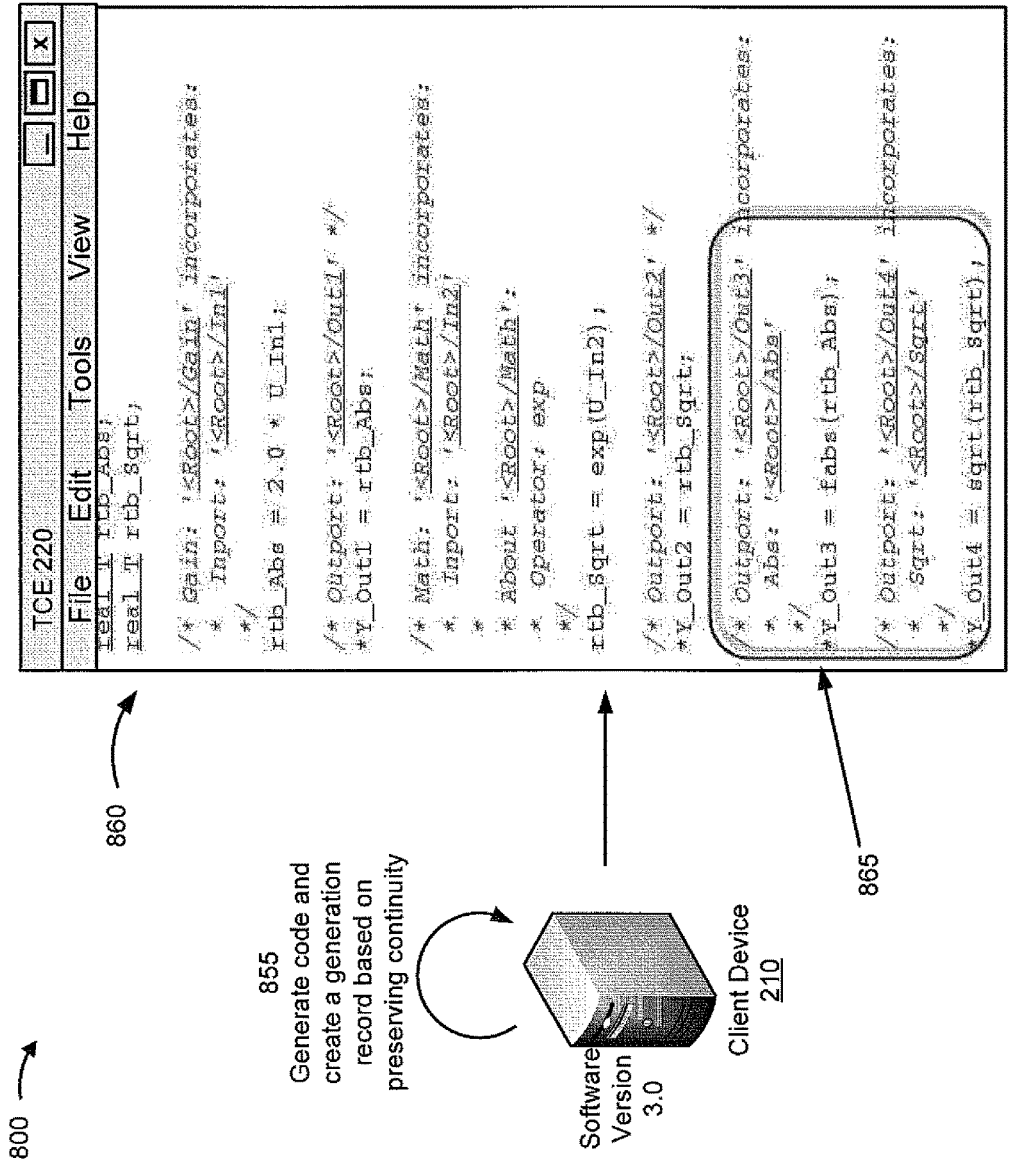

As shown in FIG. 8D, and by reference number 855, client device 210 generates code based on model ZYXW and generation record 9876, and creates a generation record based on the generated code. As shown by reference number 860, the generated code is displayed by TCE 220. As shown by reference number 865, continuity is preserved in a non-optimized manner, resulting in two local variables (e.g., "rtb_Abs" and "rtb_Sqrt") being newly declared in the generated code, and resulting in greater memory usage. In this way, the newly generated code is not optimized for memory usage using the new software version, but continuity has been preserved, resulting in less code validation for the user.

As indicated above, FIGS. 8A-8D are provided merely as an example. Other examples are possible and may differ from what was described with regard to FIGS. 8A-8D.

Figure 9A:
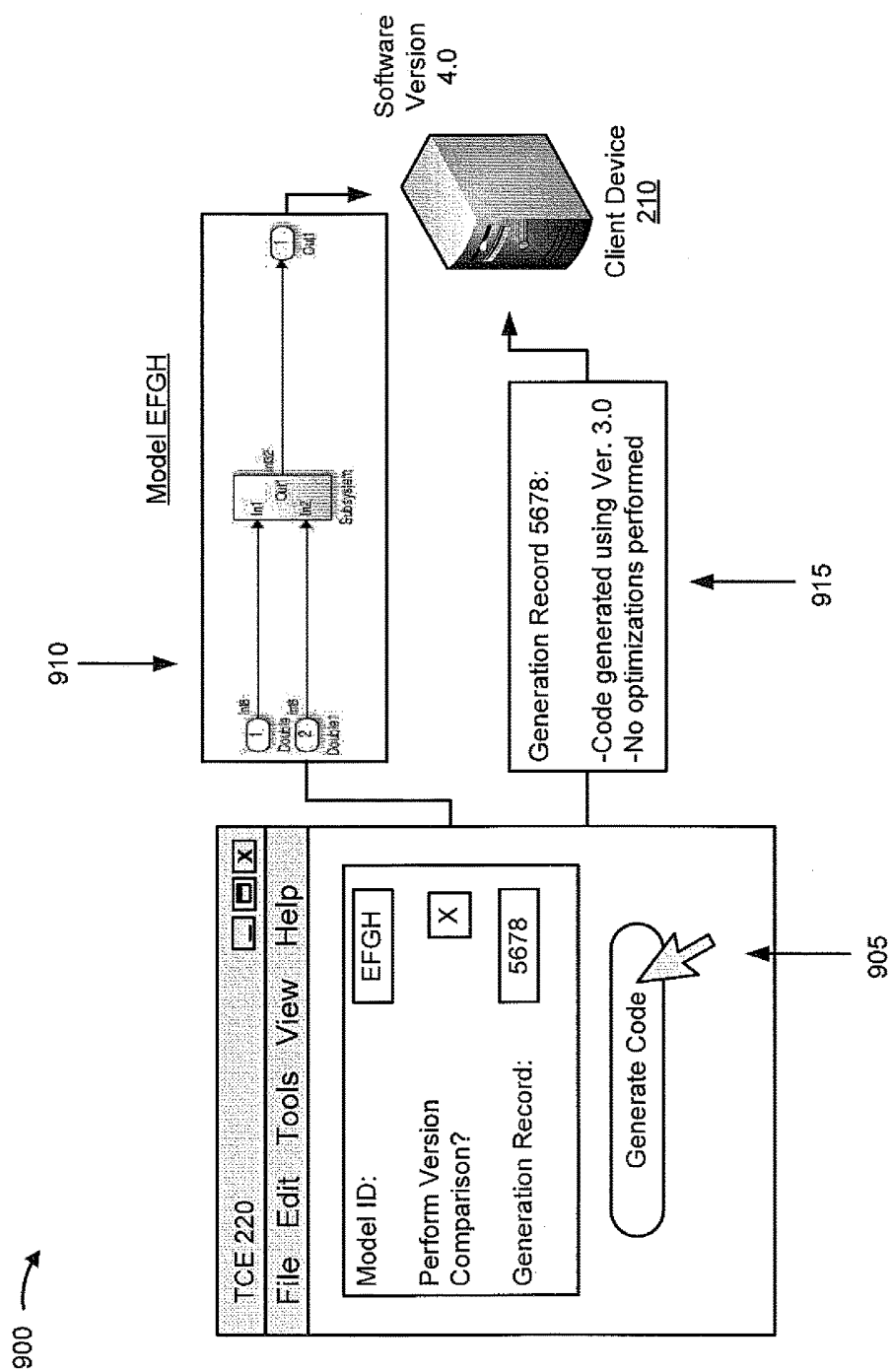
FIGS. 9A-9D are diagrams of yet another example implementation relating to the example process shown in FIG. 6.

FIGS. 9A-9D are diagrams of an example implementation 900 relating to process 600 shown in FIG. 6. As shown in FIG. 9A, example implementation 900 includes TCE 220. Assume that a user has identified a model (e.g., "Model ID: EFGH"), has instructed client device 210 to perform a comparison between a previously generated code and a newly generated code based on model EFGH (e.g., via interaction with a checkbox), and has identified a first generation record (e.g., "Generation Record: 5678"). As shown by reference number 905, based on user interaction with the "Generate Code" button, client device 210 generates code based on model EFGH. As shown by reference number 910, model EFGH is accessed and provided to client device 210. As shown by reference number 915, generation record 5678 is accessed and provided to client device 210. Generation record 5678 includes information identifying a software version used to generate a previous generated code (e.g., "Ver. 3.0") and identifying the optimizations performed in generating the previous generated code (e.g., "no optimizations performed"). Assume that the software version used by client device 210 for generating new code is "Software Version 4.0."

Figure 9B:
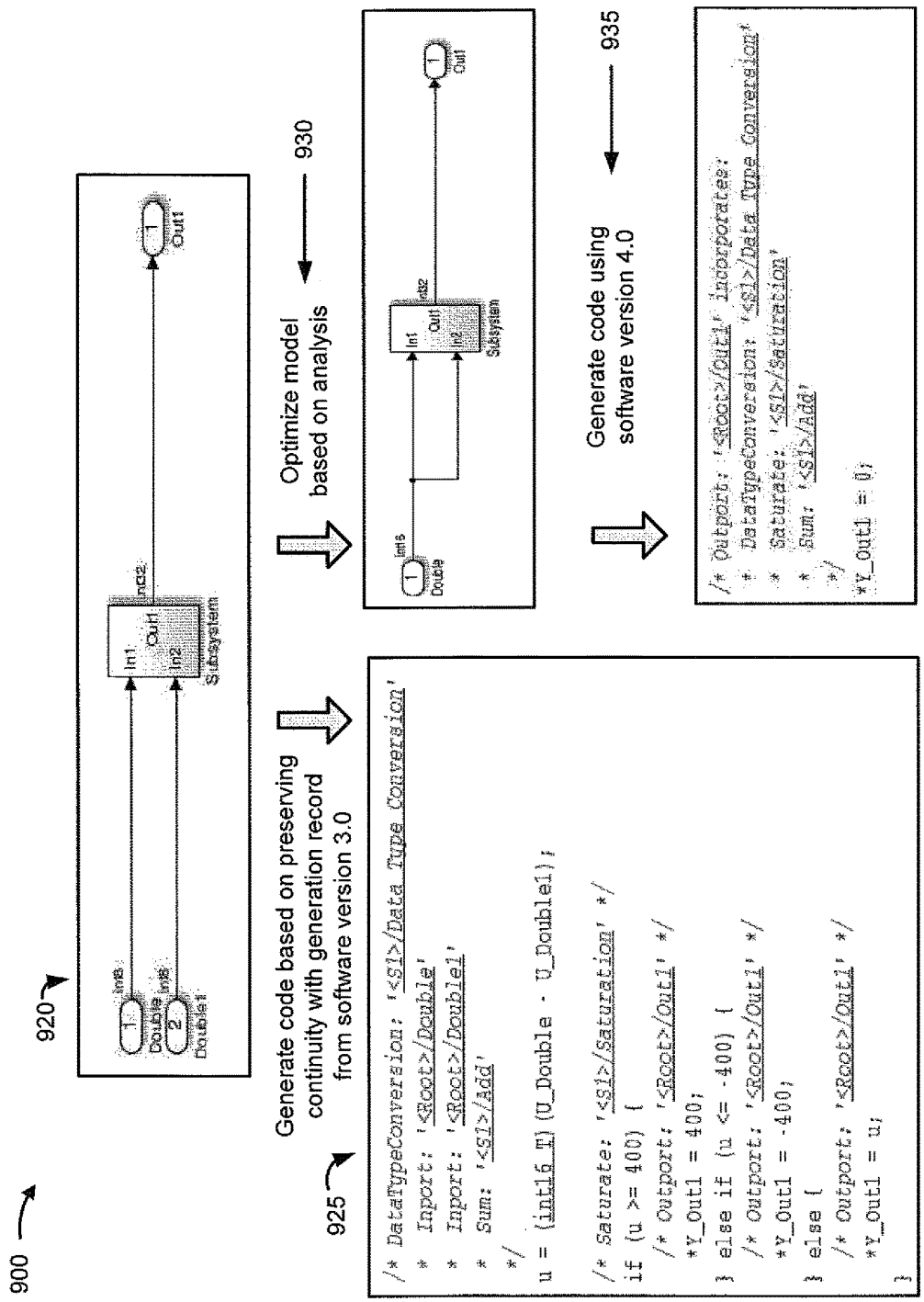

As shown in FIG. 9B, client device 210 generates new generated code based on generation record 5678 (e.g., by emulating Software Version 3.0) and independent of generation record 5678 (e.g., by using optimizations available in Software Version 4.0). As shown by reference number 920, client device 210 accesses model EFGH. As shown by reference number 925, client device 210 generates new, non-optimized generated code based on generation record 5678 (e.g., by using the software version and the optimizations identified in generation record 5678 to emulate the previous code generation that was performed using Software Version 3.0). As shown by reference number 930, client device 210 utilizes an optimization available in Software version 4.0 to analyze model EFGH and, as shown by reference number 935, generates new, optimized generated code.

Figure 9C:
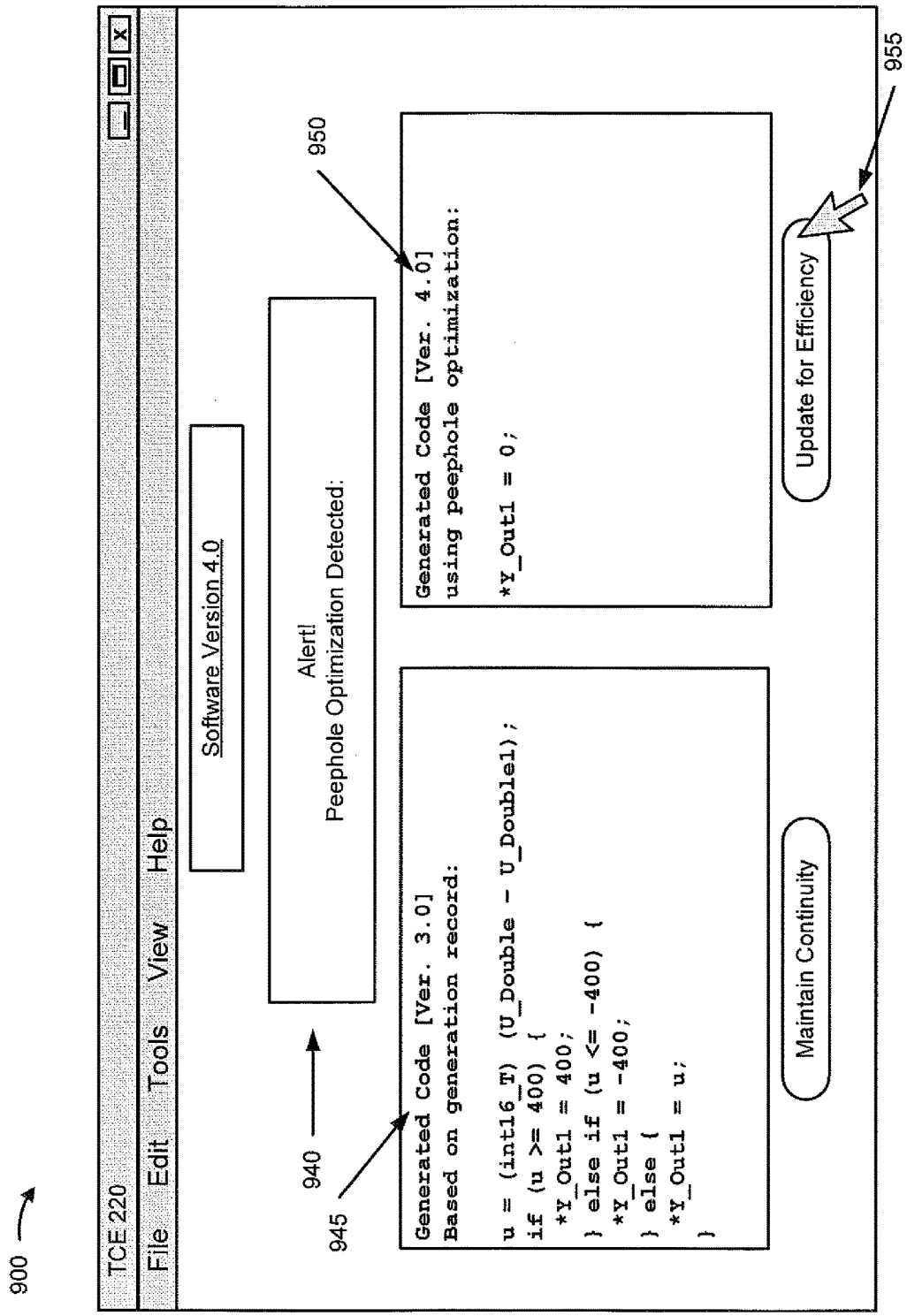

As shown in FIG. 9C, and by reference number 940, client device 210 (e.g., via TCE 220), alerts the user that an optimization (e.g., a peephole optimization) is available in the current software version (e.g., Software Version 4.0), for performance on model EFGH, that was unavailable in the previous software version (e.g., Software Version 3.0). As shown by reference numbers 945 and 950, the new, non-optimized generated code with preserved continuity is displayed side-by-side with the new, optimized generated code without preserved continuity. Based on user interaction with the "Update for Efficiency" button, client device 210 may suppress continuity preservation and select the new, optimized generated code. In another example, based on user interaction with the "Maintain Continuity" button, client device 210 may suppress the optimization to select the new, non-optimized generated code that preserves continuity.

Figure 9D:
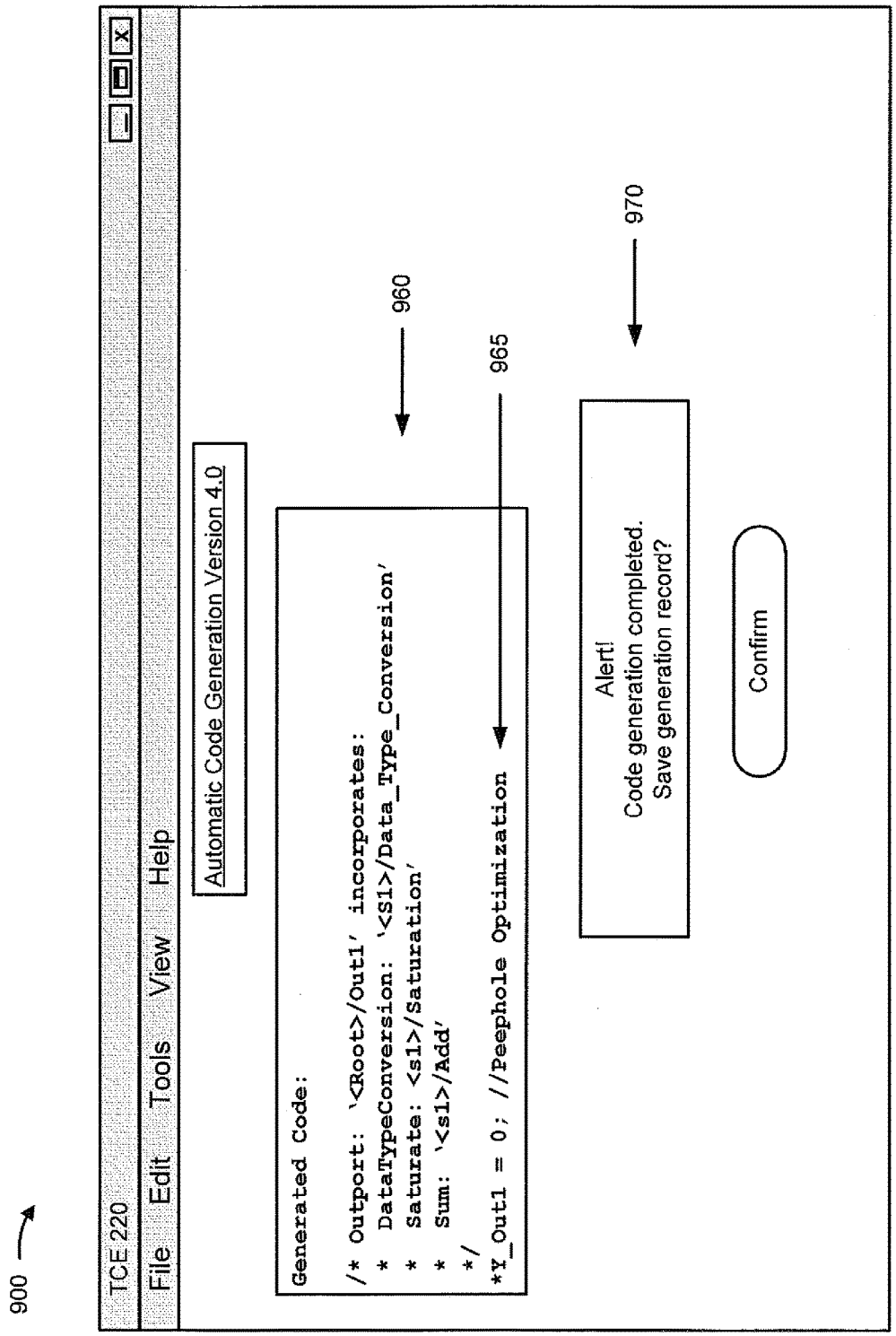

As shown in FIG. 9D, and by reference number 960, the generated code, with continuity maintenance suppressed, is provided to the user. As shown by reference number 965, client device 210 has appended information, via a comment in the program code, identifying why continuity preservation has been suppressed (e.g., because of an available peephole optimization). As shown by reference number 970, the user is queried as to whether a code generation record (not shown), is to be stored.

As indicated above, FIGS. 9A-9D are provided merely as an example. Other examples are possible and may differ from what was described with regard to FIGS. 9A-9D.

Figure 10A:
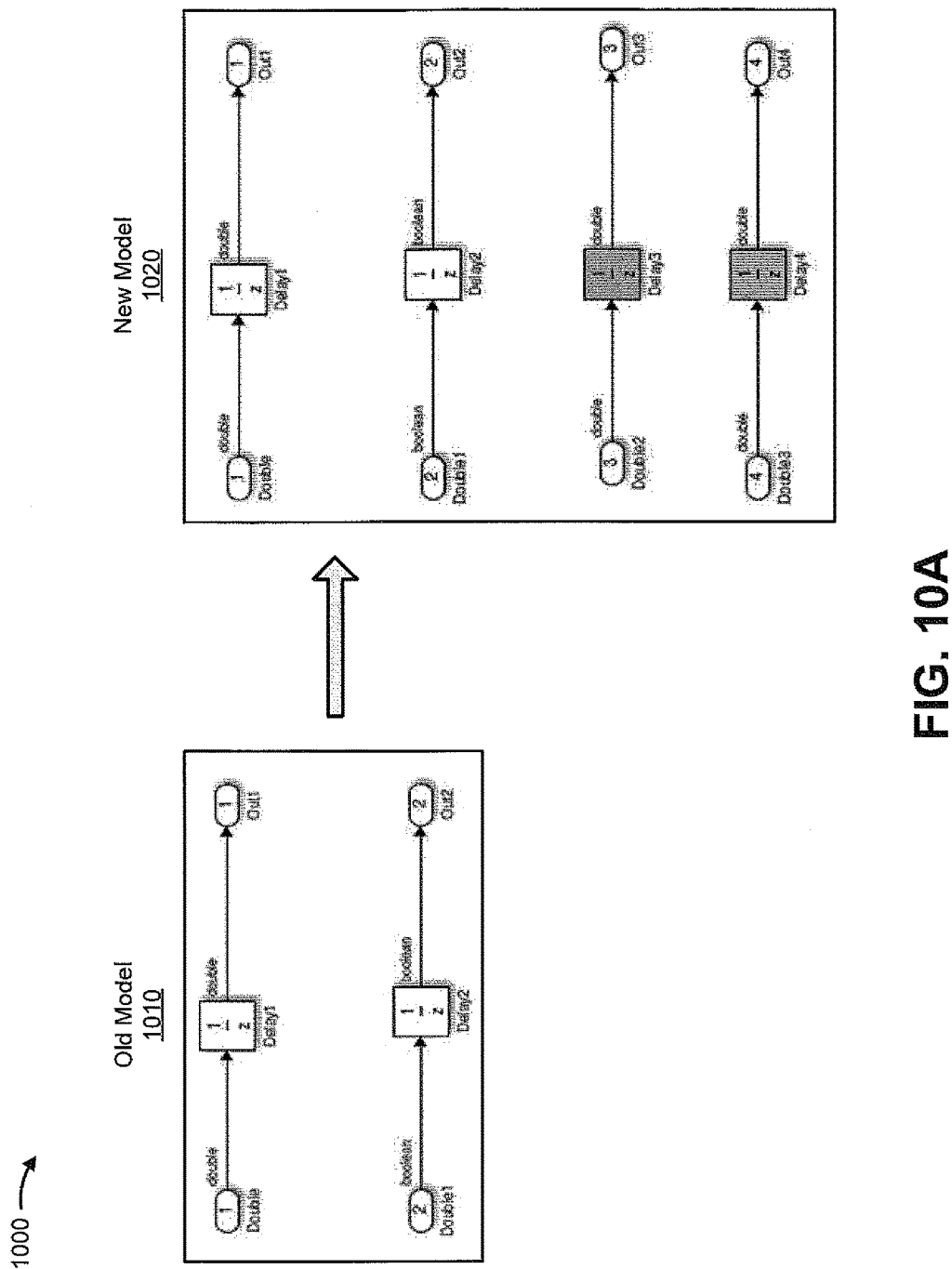
Figure 10B:
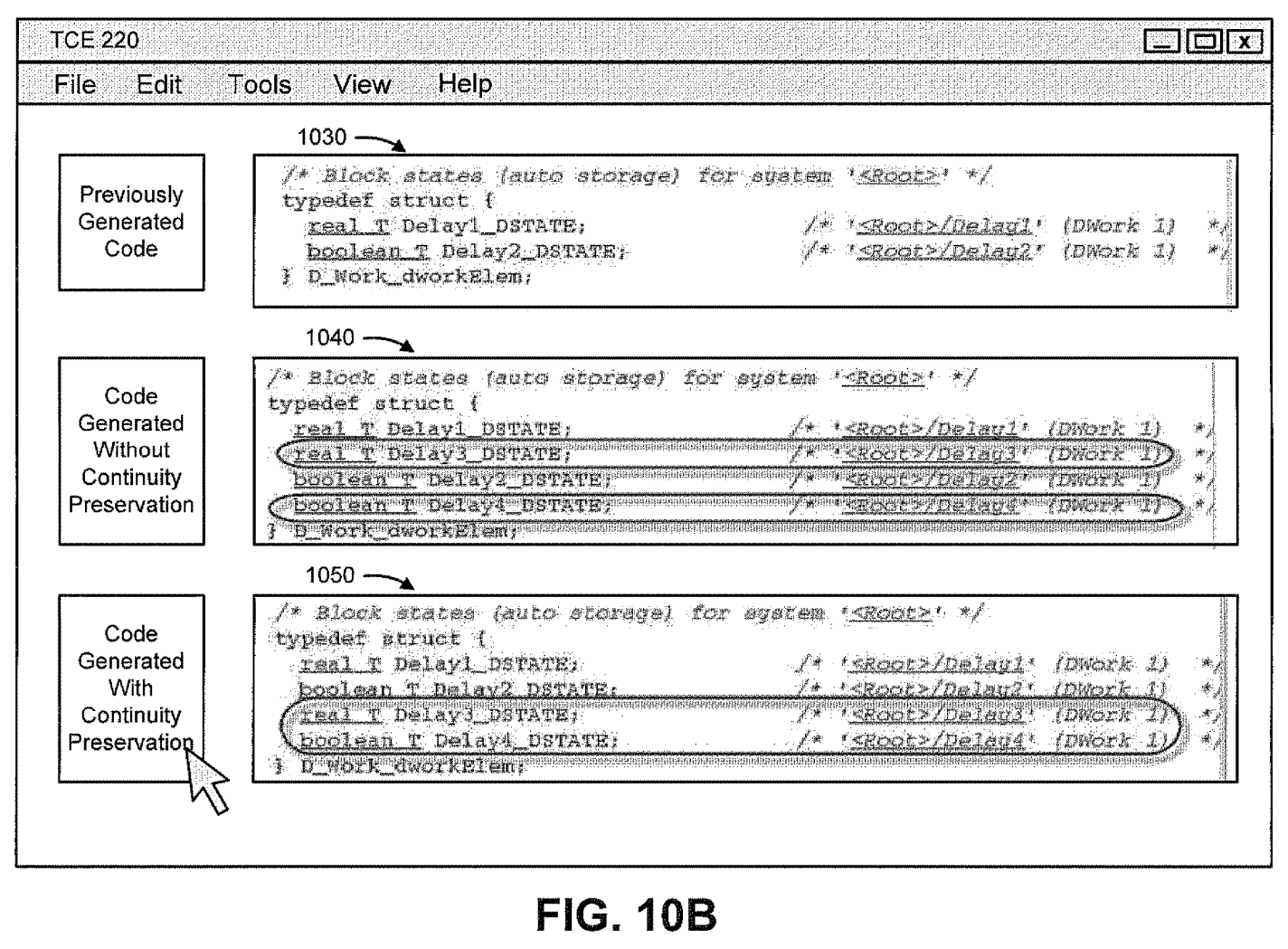

FIGS. 10A and 10B are diagrams of an example implementation 1000 relating to process 600 shown in FIG. 6. As shown in FIG. 10A, model 1010 (e.g., "Old Model") may include two delay blocks. For each delay block, state information may be defined in generated code. As further shown in FIG. 10A, model 1010 may be updated to include two additional delay blocks, thereby creating model 1020 (e.g., "New Model").

As shown in FIG. 10B, and by reference number 1030, the state information associated with model 1010 may be defined using the "typedef" function. As shown by reference number 1040, TCE 220 generates first generated code without preserving continuity. The first generated code includes state information for the two additional delay blocks (e.g., the circled lines of code) interspersed in the previously generated code; interspersing changes within previously generated code may lead to unpredictable behavior. As shown by reference number 1050, TCE 220 generates second code with continuity preserved from the previously generated code. The second generated code includes state information for the two additional delay blocks (e.g., the circled lines of code) after the previously generated code. Generating code to preserve continuity results in TCE 220 replacing the distributed, unpredictable code discontinuity with a predictable discontinuity at a risk of losing performance optimality.

As indicated above, FIGS. 10A and 10B are provided merely as an example. Other examples are possible and may differ from what was described with regard to FIGS. 10A and 10B.

Figure 11A:
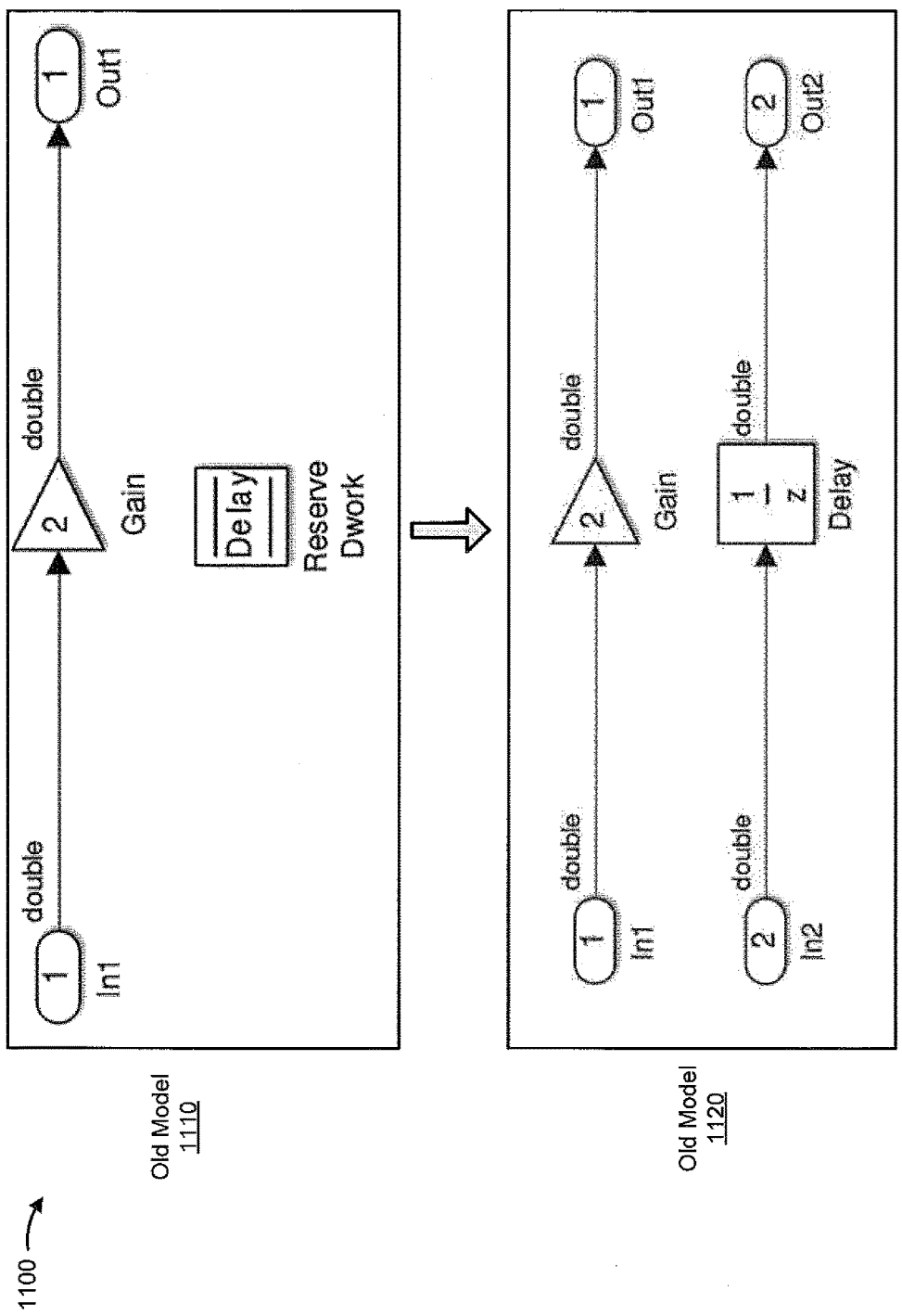
FIGS. 11A and 11B are diagrams of yet another example implementation relating to the example process shown in FIG. 6.
Figure 11B:
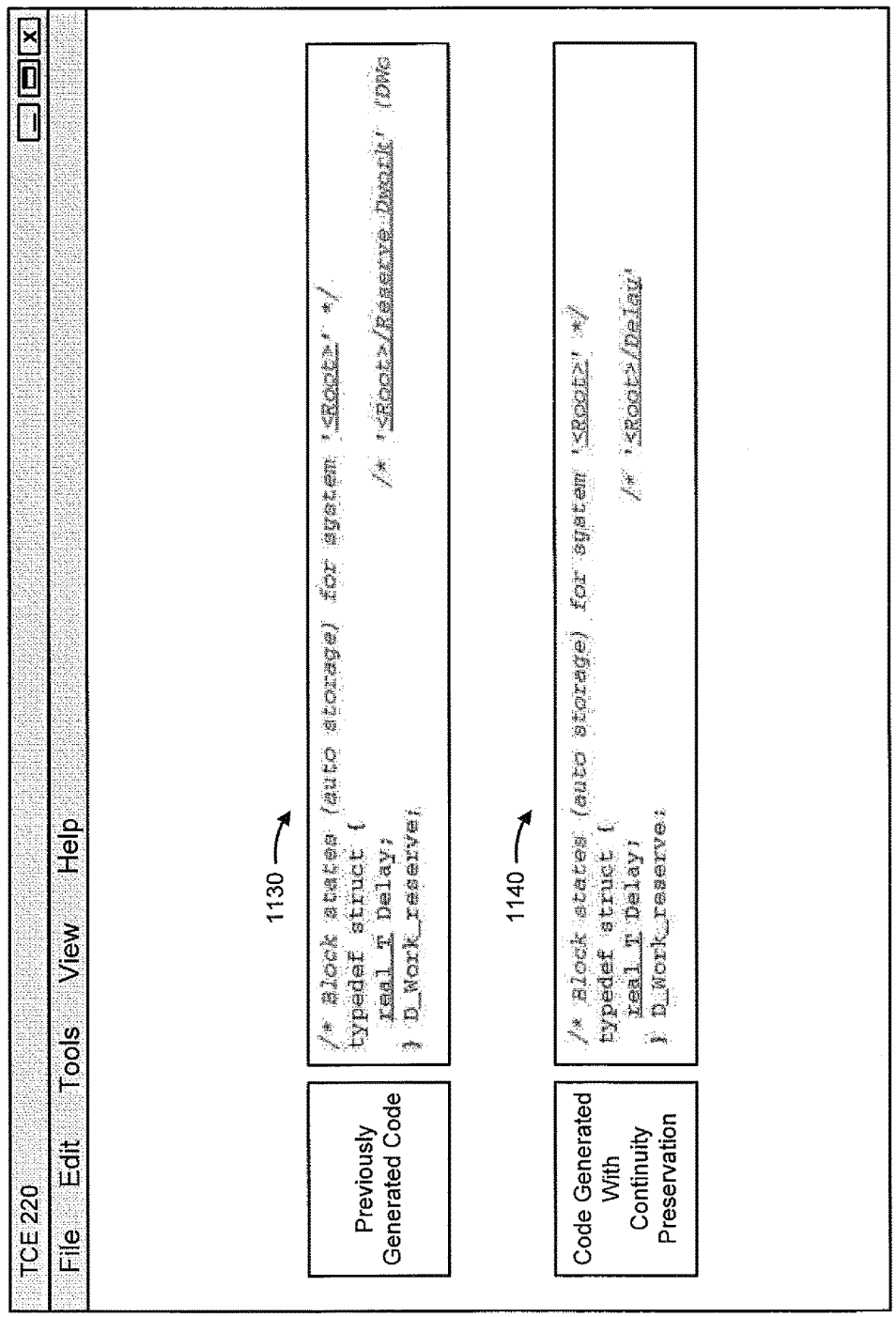

FIGS. 11A and 11B are diagrams of an example implementation 1100 relating to process 600 shown in FIG. 6. As shown in FIG. 11A, model 1110 (e.g., "Old Model") may include a reserved "Delay" block. As further shown in FIG. 11A, model 1120 (e.g., "New Model") may utilize the reserved Delay block to include a delay function.

As shown in FIG. 11B, and by reference number 1130, the previously generated code is determined based on a generation record. The previously generated code includes a reserved element (e.g., as indicated by the comment "/*<Root>/Reserve_Dwork' . . . " and "D_Work_reserve;"). As shown by reference number 1140, TCE 220 generates code based on the generation record. TCE 220 uses the previously reserved element, identified from the generation record, to include a new delay function.

As indicated above, FIGS. 11A and 11B are provided merely as an example. Other examples are possible and may differ from what was described with regard to FIGS. 11A and 11B.

Figure 12:
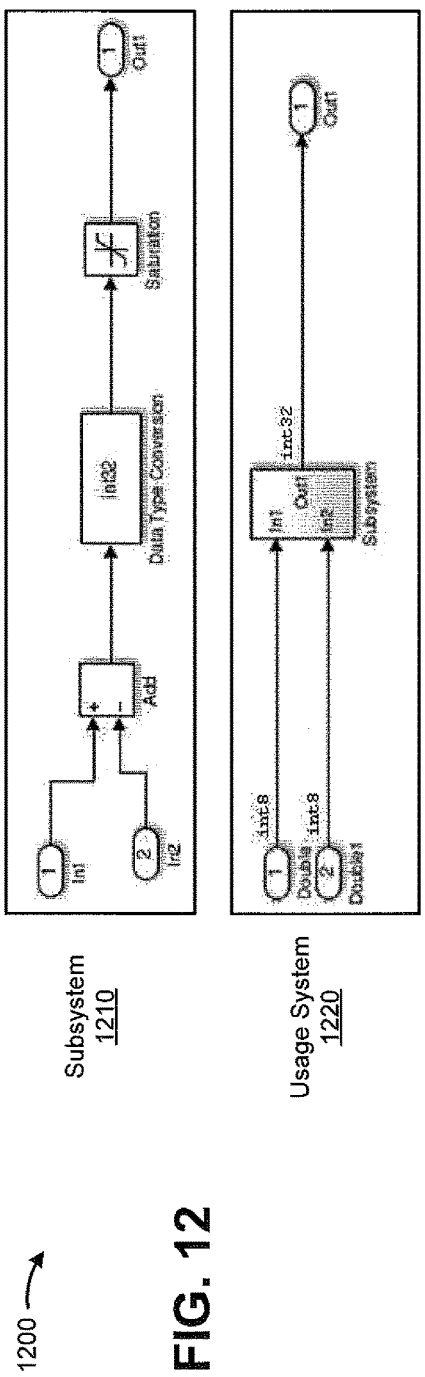
FIG. 12 is a diagram of yet another example implementation relating to the example process shown in FIG. 6.
Figure 12:
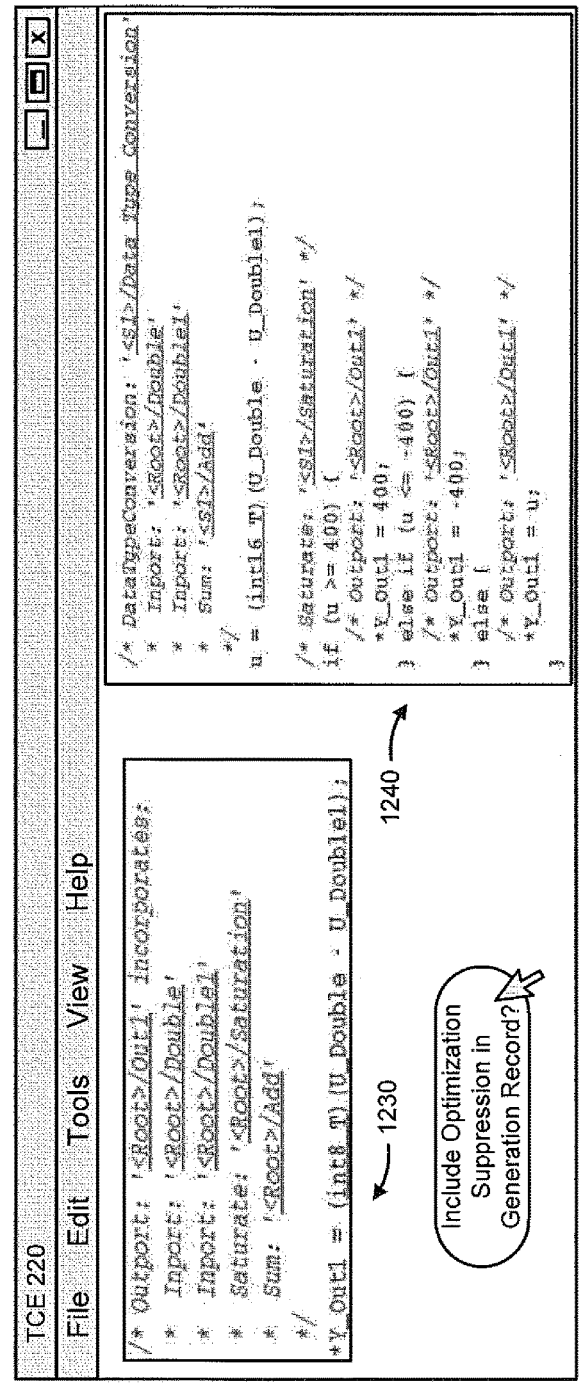

FIG. 12 is a diagram of an example implementation 1200 relating to the example process 600 shown in FIG. 6. As shown in FIG. 12, a first model (e.g., subsystem 1210) may be used in the context of a second model (e.g., usage system 1220). Due to the datatype of the inputs to usage system 1220 (e.g., "int8") the output of the addition block may range between −256 and 256. Consequently, the generated code may take the form shown by reference number 1230. If, however, usage system 1220 is changed to allow a different datatype of inputs (e.g., "int16"), then the generated program code, generated based on a code generation record, will include saturating logic and take the form shown by reference number 1240. In a future version of TCE 220, saturating logic may be present for inputs of the datatype int8. Consequently, based on user interaction with the "Include Optimization Suppression in Generation Record" button, TCE 220 may include information instructing a subsequent version of TCE 220 to suppress advancements in order to maintain code continuity.

As indicated above, FIG. 12 is provided merely as an example. Other examples are possible and may differ from what was described with regard to FIG. 12.

Implementations described herein may allow a device to generate code and create a generation record. Furthermore, the device may use the generation record to generate new code that preserves continuity with previously generated code.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

As used herein, code and program code are to be broadly interpreted to include text-based code that may not require further processing to execute (e.g., C++ code, Hardware Description Language (HDL) code, very-high-speed integrated circuits (VHSIC) HDL (VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, program code may include different combinations of the above-identified classes (e.g., text-based code, binary code, text files, etc.). Additionally, or alternatively, program code may include code generated using a dynamically-typed programming language (e.g., the M language, a MATLAB® language, a MATLAB-compatible language, a MATLAB-like language, etc.) that can be used to express problems and/or solutions in mathematical notations. Additionally, or alternatively, program code may be of any type, such as a function, a script, an object, etc., and a portion of program code may include one or more characters, lines, etc. of the program code.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more processors to:
      receive input comprising information associated with a predetermined degree of similarity between first code and second code,
         the first code being generated, using a first computing environment that uses a first code generation optimization process, based on a model included in the first computing environment, and the second code to be generated, based on the model, using a second computing environment that is different from the first computing environment, the second computing environment using at least one code generation optimization process that includes a second code generation optimization process different than the first code generation optimization process;

obtain information regarding a generation record associated with the first code, the generation record including information associated with the first code generation optimization process used by the first computing environment during generation of the first code;

determine, based on the predetermine degree of similarity and the generation record, to suppress the second code generation optimization process when generating the second code within the second computing environment;

generate the second code using the second computing environment based on the model, the second code being generated without using the second code generation optimization process based on the second code generation optimization process being suppressed in the second computing environment, the second code preserving the predetermined degree of similarity with the first code, and the predetermined degree of similarity being based on one or more metrics associated with the first code and the second code, the one or more metrics including:
a random access memory usage,
a read only memory usage,
a quantity of lines of different program code, or
a cyclomatic complexity, the predetermined degree of similarity satisfying a threshold level of the one or more metrics, and the predetermined degree of similarity being based on one or more preset conditions associated with the first code and the second code, the one or more preset conditions including:
minimizing the quantity of lines of different program code between the first code and the second code, or
maintaining variable labeling between the first code and the second code.

2. The device of claim 1, wherein the one or more processors are further to:

determine that a decision step associated with generating the second code results in a change in the predetermined degree of similarity from the first code;

provide information identifying the change in the predetermined degree of similarity and the decision step;

receive information associated with determining whether to preserve the predetermined degree of similarity with respect to the decision step; and selectively preserve the predetermined degree of similarity, with respect to the decision step, based on the information associated with determining whether to preserve the predetermined degree of similarity.

3. A non-transitory computer-readable medium storing instructions, the instructions comprising:

one or more instructions that, when executed by one or more processors, cause the one or more processors to:

receive input comprising information associated with a predetermined degree of similarity between first code and second code, the first code being generated, using a first computing environment that uses a first code generation optimization process, based on a model included in the first computing environment, and the second code to be generated, based on the model, using a second computing environment that is different from the first computing environment, the second computing environment using at least one code generation optimization process that includes a second code generation optimization process different than the first code generation optimization process;

receive information regarding a generation record associated with the first code, the generation record including information associated with the first code generation optimization process used by the first computing environment to generate the first code;

determine, based on the predetermined degree of similarity and the generation record, to suppress the second code generation optimization process when generating the second code using the second computing environment;

generate the second code using the second computing environment based on the model, the second code being generated without using the second code generation optimization process based on the second code generation optimization process being suppressed in the second computing environment, the second code preserving the predetermined degree of similarity with the first code, and the predetermined degree of similarity being based on one or more metrics associated with the first code and the second code, the one or more metrics including:
a random access memory usage,
a read only memory usage,
a quantity of lines of different program code, or
a cyclomatic complexity, the predetermined degree of similarity satisfying a threshold level of the one or more metrics, and the predetermined degree of similarity being based on one or more preset conditions associated with the first code and the second code, the one or more preset conditions including:
minimizing the quantity of lines of different program code between the first code and the second code, or
maintaining variable labeling between the first code and the second code.

4. The non-transitory computer readable medium of claim 3, wherein the one or more instructions, when executed by the one or more processors, further cause the one or more processors to:

identify a variable identifier used in the first code;

determine to preserve the variable identifier between versions of code; and wherein the one or more instructions, that cause the one or more processors to generate the second code, cause the one or more processors to:

generate the second code based on determining to preserve the variable identifier between versions of code.

5. A method, comprising:
receiving input comprising information associated with a predetermined degree of similarity between first code and second code,
the first code being generated, by a first computing environment that uses a first code generation optimization process, based on a model included in the first computing environment,
the second code to be generated, based on the model, by a second computing environment that is different from the first computing environment,
the second computing environment using at least one code generation optimization process that includes a second code generation optimization process different than the first code generation optimization process, and
the receiving the input being performed by a device;
obtaining information regarding a generation record associated with the first code,
the generation record including information associated with the first code generation optimization process used by the first computing environment during generation of the first code, and
the obtaining the information regarding the generation record being performed by the device;
determining, based on the predetermined degree of similarity and the generation record, to suppress the second code generation optimization process when generating the second code using the second computing environment,
the determining to suppress being performed by the device; and
generating the second code using the second computing environment based on the model,
the second code being generated without using the second code generation optimization process based on the second code generation optimization process being suppressed in the second computing environment,
the second code preserving the predetermined degree of similarity with the first code,
the generating being performed by the device, and
the predetermined degree of similarity being based on one or more metrics associated with the first code and the second code,
the one or more metrics including:
a random access memory usage,
a read only memory usage,
a quantity of lines of different program code, or
a cyclomatic complexity,
the predetermined degree of similarity satisfying a threshold level of the one or more metrics, and
the predetermined degree of similarity being based on one or more preset conditions associated with the first code and the second code,
the one or more preset conditions including:
minimizing the quantity of lines of different program code between the first code and the second code, or
maintaining variable labeling between the first code and the second code.

6. The device of claim 1, wherein the predetermined degree of similarity is that the first code and the second code are the same.

7. The device of claim 1, wherein the one or more processors are further to:
receive information associated with one or more objectives for the second code;
receive information associated with a priority of the predetermined degree of similarity relative to the one or more objectives; and
wherein the one or more processors, when generating the second code, are to:
generate the second code based on the one or more objectives and the priority.

8. The device of claim 7, wherein the one or more objectives comprise at least one of random access memory (RAM) performance, read only memory (ROM) performance, central processing unit (CPU) performance, or traceability.

9. The non-transitory computer-readable medium of claim 3, wherein the predetermined degree of similarity is that the first code and the second code are the same.

10. The non-transitory computer-readable medium of claim 3, wherein the one or more instructions, when executed by the one or more processors, further cause the one or more processors to:
receive information associated with one or more objectives for the second code;
receive information associated with a priority of the predetermined degree of similarity relative to the one or more objectives; and
wherein the one or more instructions, that cause the one or more processors to generate the second code, cause the one or more processors to:
generate the second code based on the one or more objectives and the priority.

11. The non-transitory computer-readable medium of claim 10, wherein the one or more objectives comprise at least one of random access memory (RAM) performance, read only memory (ROM) performance, central processing unit (CPU) performance, or traceability.

12. The non-transitory computer-readable medium of claim 3, wherein the input identifies a threshold associated with the predetermined degree of similarity.

13. The method of claim 5, wherein the predetermined degree of similarity is that the first code and the second code are the same.

14. The method of claim 5, further comprising:
receiving information associated with one or more objectives for the second code;
receiving information associated with a priority of the predetermined degree of similarity relative to the one or more objectives; and
wherein generating the second code comprises:
generating the second code based on the one or more objectives and the priority.

15. The method of claim 14, wherein the one or more objectives comprise at least one of random access memory (RAM) performance, read only memory (ROM) performance, central processing unit (CPU) performance, or traceability.

16. The method of claim 5, wherein the input identifies a threshold associated with the predetermined degree of similarity.

17. A device, comprising:
one or more processors to:
receive input comprising information associated with a predetermined degree of similarity between first code and second code,
the first code being generated, using a first computing environment that uses a first code generation optimization process, based on a model included in the first computing environment, the second code to be generated, based on the model, using a second computing environment that is different from the first computing environment, the second computing environment using at least one code generation optimization process that includes a second code generation optimization process different than the first code generation optimization process;

obtain information regarding a generation record associated with the first code, the generation record including information associated with the first code generation optimization process used by the first computing environment during generation of the first code;

determine, based on the predetermined degree of similarity and the generation record, to suppress the second code generation optimization process when generating the second code using the second computing environment, receive a modification to the model prior to generating the second code; and generate the second code based on the modification to the model and using the second computing environment, the second code being generated without using the second code generation optimization process based on the second code generation optimization process being suppressed in the second computing environment, the second code preserving the predetermined degree of similarity with the first code, and the predetermined degree of similarity being based on one or more metrics associated with the first code and the second code, the one or more metrics including:
 a random access memory usage,
 a read only memory usage,
 a quantity of lines of different program code, or
 a cyclomatic complexity, the predetermined degree of similarity satisfying a threshold level of the one or more metrics, and the predetermined degree of similarity being based on one or more preset conditions associated with the first code and the second code, the one or more preset conditions including:
 minimizing the quantity of lines of different program code between the first code and the second code, or
 maintaining variable labeling between the first code and the second code.

18. The device of claim 1, where the second code generation optimization process is not available for use in the first computing environment.

19. The device of claim 1, where the one or more processors, when generating the second code, are to:
use the first code generation optimization process in place of the second code generation optimization process to generate the second code in the second computing environment based on determining to suppress the second code generation optimization process.

20. The device of claim 1, where the first computing environment is a previous software version of the second computing environment, and where the first code generation optimization process is a previous version of the second code generation optimization process.

\* \* \* \* \*